(12) United States Patent
Iwamoto et al.

(10) Patent No.: US 7,436,879 B1
(45) Date of Patent: *Oct. 14, 2008

(54) SPREAD COMMUNICATION SYSTEM AND MOBILE STATION THEREOF

(75) Inventors: Hiroaki Iwamoto, Kanagawa (JP); Nobuhisa Aoki, Kanagawa (JP); Takaharu Nakamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,276

(22) Filed: Dec. 2, 1999

(30) Foreign Application Priority Data

Jan. 7, 1999 (JP) ................................. 11-002128

(51) Int. Cl.
H04B 1/00 (2006.01)

(52) U.S. Cl. ..................................... 375/150

(58) Field of Classification Search ................. 375/150, 375/147, 148, 343, 354, 355, 364; 370/335, 370/337, 347
See application file for complete search history.

(56) References Cited

U.S. PATENT DOCUMENTS

| | | | | |
|---|---|---|---|---|
| 4,943,974 A | * | 7/1990 | Motamedi | 375/1 |
| 5,533,014 A | * | 7/1996 | Willars et al. | 370/335 |
| 5,598,429 A | * | 1/1997 | Marshall | 375/210 |
| 5,625,627 A | * | 4/1997 | Ishi | 370/347 |
| 5,732,327 A | * | 3/1998 | Yoshimi et al. | 455/67.11 |
| 6,028,883 A | * | 2/2000 | Tiemann et al. | 375/200 |
| 6,163,694 A | * | 12/2000 | Lind et al. | 455/435.3 |
| 6,167,037 A | * | 12/2000 | Higuchi et al. | 370/335 |
| 6,188,679 B1 | * | 2/2001 | Sato | 370/335 |
| 6,223,031 B1 | * | 4/2001 | Naslund | 455/423 |
| 6,249,539 B1 | * | 6/2001 | Harms et al. | 375/130 |
| 6,259,683 B1 | * | 7/2001 | Sekine et al. | 370/342 |
| 6,307,849 B1 | * | 10/2001 | Tiedemann, Jr. | 370/335 |
| 6,487,418 B1 | * | 11/2002 | Magana et al. | 455/464 |
| 6,539,009 B1 | * | 3/2003 | Zhou et al. | 370/342 |
| 6,546,064 B1 | * | 4/2003 | Hayashi | 375/354 |
| 6,556,620 B1 | * | 4/2003 | Ohnishi | 375/149 |
| 2002/0034171 A1 | * | 3/2002 | Smith et al. | 370/337 |

* cited by examiner

Primary Examiner—Sam K Ahn
(74) Attorney, Agent, or Firm—Myers Wolin, LLC

(57) ABSTRACT

A system and apparatus including a mobile station for use in a spread communication system having a spread signal on a particular channel for establishing synchronization. The particular channel for establishing synchronization existing on a plurality of frequencies. The mobile station includes a receiving unit receiving the plurality of frequencies; a measuring unit measuring a strength or a correlation value of the spread signal of the particular channel for each of the plurality of frequencies received by said receiving unit; and a synchronization establishing unit establishing synchronization based on the measured strength or correlation value of the spread signal.

29 Claims, 18 Drawing Sheets

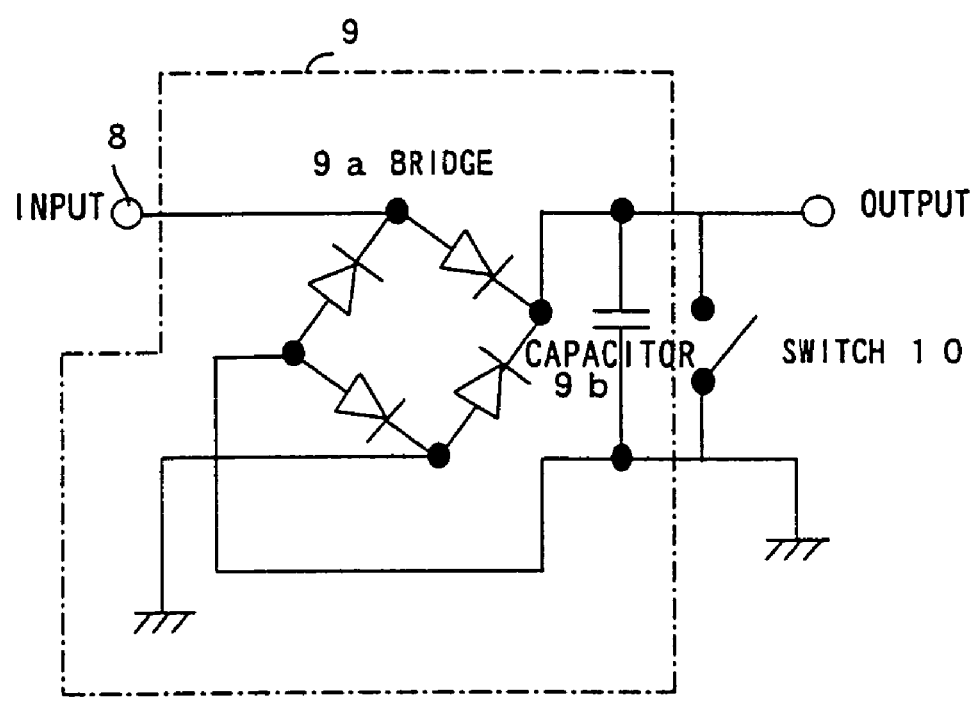
F I G. 3

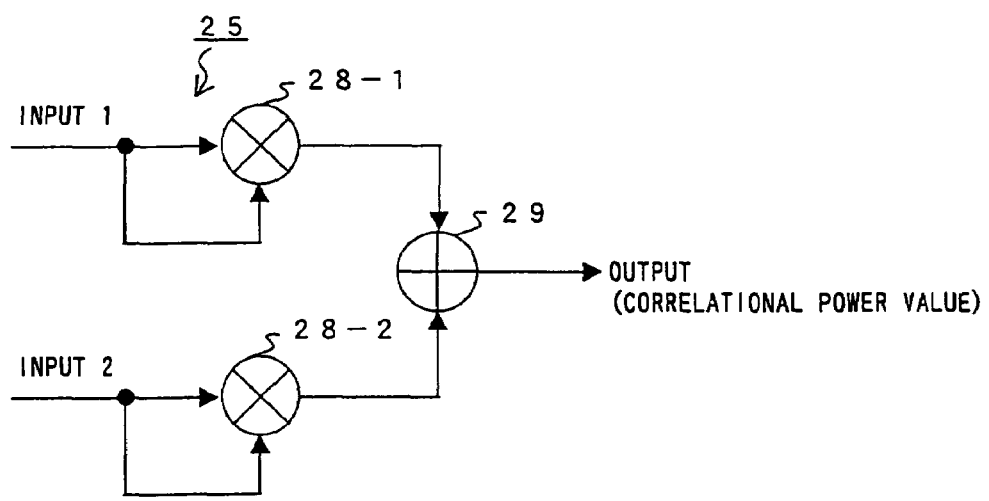
F I G. 6

| | +0 | +1 | +2 | +3 (UNIT: WORD) |
|---|---|---|---|---|
| | RANKING | FREQUENCY DATA | TIMING | CORRELATIONAL SQUARE AMPLITUDE CALCULATION VALUE |
| DataStart | 1 | 00 | 50 | 100 |
| DataStart+4 | 2 | 01 | 50 | 99 |
| DataStart+8 | 3 | 10 | 50 | 90 |
| DataStart+12 | 4 | 00 | 75 | 89 |
| DataStart+16 | 5 | 01 | 75 | 85 |
| | ... | | | |
| DataEnd (UNIT: WORD) | N | | | |

SPREAD COMMUNICATION SYSTEM AND MOBILE STATION THEREOF

BACKGROUND OF THE INVENTION

1. Field of the Invention

The present invention relates to a DS-CDMA (Direct Sequence-Code Division Multiple Access) base station asynchronous cellular system, and more particularly to an initial cell search method for a mobile station and a transmission power control method for a perch channel at a base station, which is combined with the initial cell search method.

2. Description of the Related Art

In recent years, the downsizing and the popularization of a cellular phone, etc. have been rapidly advancing with the size-reduction of a processor, etc. In a system accommodating such a cellular phone, a continuously moving mobile station must be accommodated in a suitable base station. At the same time, a system which accommodates mobile stations as many as possible is desired for the upcoming popularization of a cellular phone. However, since an available frequency bandwidth is limited with a conventional frequency division multiplexing technique, the number of mobile stations which can be accommodated is limited as a matter of course. Accordingly, close attentions are currently paid to a CDMA communication using a direct sequence. In the CDMA communication, a transmission signal is spread-modulated with a spread code which differs depending on each channel accommodated by a base station. On a receiving side, the transmission signal is regenerated by despreading the spread-modulated signal with the same code as that used by the base station. In this case, the reception signal must be multiplied by the despread code (the same as that used on the transmitting side) at suitable timing on the mobile station side, that is, the receiving side. Accordingly, to which channel of which base station a mobile station is to be connected is determined in the initial stage of the communication. At the same time, the multiplication timing of a despread code, which is intended to continuously connect the mobile station to that channel must be obtained. Namely, an initial cell search must be made.

The initial cell search is an operation for initially determining a visited cell of a mobile station (the visited cell is an area where a particular base station can accommodate a mobile station when the mobile station stays within the visited cell) when the mobile station power is turned on. At this time, the mobile station receives a perch channel transmitted from the base station, and attempts to obtain the information broadcast by the channel. The perch channel is a channel which helps a mobile station identify the despread code of the signal transmitted from a base station, or capture the channel transmitted to obtain despreading timing in the initial cell search.

In the system which is assumed by the present invention and will be described later, a perch channel is spread with a short code for synchronously capturing the perch channel, and a long code for identifying the channel from the base station. The perch channel is assumed to be further spread with a group short code indicating to which group the long code used for the perch channel belongs among many long codes so as to facilitate a long code search. Here, all of the short code, the group short code, and the long code are spread codes which respectively have their use purposes.

Since which long code is used for a certain downstream channel (a channel used for a communication from a base station to a mobile station) cannot be identified, it must be identified by examining the long code of a particular (perch) channel. Additionally, also the phase of the long code (the despreading timing when the long code is used in a communication) must be identified.

As the conventional initial cell search method of a DS-CDMA system with a control channel, which uses a long code which differs depending on each cell and a synchronization short code common to all cells, the technique disclosed by the Japanese Laid-open Patent Publication No. 10-126380 can be cited. With this conventional technique, the initial cell search for a single-frequency carrier wave signal can be made at high speed. Furthermore, as the technique obtained by further developing the above described conventional technique, "A High-speed Cell Search Method Using a Long Code Mask in DS-CDMA Base Station Asynchronous Cellular" recited in the Electronic Information Communication Society Research and Technical Report RCS96-i22) exists. The format of the perch channel signal to which the above described techniques are applied is shown in FIG. 1.

FIG. 1 shows that a perch channel 100 signal is transmitted from the left to the right of this figure. A long code is intended to identify a channel accommodated by a base station. When a communication is made using the channel identified by the long code used by a certain base station, signals are transmitted and received by spreading and despreading the signals with this long code in all cases during a call. The perch channel signal is spread with the long code unique to the channel, and is further spread with a short code for synchronously capturing the perch channel 100 signal, which is common to all of base stations. The beginning portion of the long code, which is spread with the common short code, does not include a long code. The portion where no long code exists is further spread with a group short code indicating to which group the used long code belongs among many long code groups in addition to the common short code.

This initial cell search method is mainly composed of three stages. These stages are summarized below.

[First Stage] A destination base station whose reception power is maximized is determined by performing a correlational square amplitude operation between a reception signal and a short code, and by taking an average value of the correlational square amplitude operation. At the same time, slot synchronization is made. Here, the slot synchronization is the timing at which a despreading process is performed with the short code, the group short code, and the long code. Additionally, the correlational square amplitude calculation is an operation for calculating the correlation values for an I signal and a Q signal of a reception signal, and for squaring and adding the correlation values for the I signal and the Q signal, which are obtained by the above described calculation. This operation is equivalent to an operation for squaring the length of a vector when the correlation value of a signal is recognized to be the vector on an I-Q plane where the correlation values of the I and the Q signal are respectively indicated by the horizontal and the vertical axes. The reason that the average value of the correlational square amplitude calculation is taken is to suppress an influence of noise included in a correlation value.

[Second Stage] A group short code corresponding to a plurality of long codes is identified by using the slot synchronization timing established in the first stage. Used to identify the group short code is a method for calculating the correlation value of a reception signal with the group short code, and for determining whether or not the correlation value equal to or larger than a predetermined value is obtained. Long code candidates are limited at this stage.

[Third Stage] The long code synchronization and the long code of the perch channel are determined based on the result of the correlational square amplitude operation between the reception signal and the long code. The long code determination method is a method for calculating a correlation value with a reception signal by using both of the long code and the common short code, and for determining that the long code used for the perch channel is obtained when a predetermined or larger correlation value is obtained. If this process is unsuccessfully performed, the process goes back to the first stage and another long code candidate is used.

For the details of the conventional initial cell search method, please refer to the above described patent publication or technical document.

However, it is impossible to apply this technique to a DS-CDMA cellular system using a perch channel of a multiple-carrier-frequencies signal as it is. This is because perch channels exist at a plurality of frequencies, and the operation for receiving all of the frequencies is essential for the initial cell search in such a system. A solution to this problem is not recited by the conventional technique. If the above described conventional initial search method is sequentially performed for the respective carrier frequencies, in the worst case, the operations at the first through the third stages may be considered to be performed for all of the frequencies. In this case, at least a cell search time multiplied by the number "Nf" (the number of downstream carrier frequencies) of carrier frequencies is required compared with the case of a single carrier frequency.

Additionally, when many mobile stations concentrate on a single cell in the conventional DS-CDMA system, mobile stations exceeding the capacity of one base station attempt to access the station, which can possibly lead to a fault such as a communication quality degradation or communication disability.

SUMMARY OF THE INVENTION

An object of the present invention is to provide a system which can efficiently accommodate subscribers in respective base stations in a spread communication system using a single-carrier frequency or multiple carrier frequencies.

A mobile station according to the present invention, which is a mobile station for use in a spread communication system having a particular channel for establishing synchronization, comprises: a receiving unit for receiving a spread signal of a particular channel; a measuring unit for measuring the strength or correlation value of the spread signal received by the receiving unit; a comparing unit for comparing the signal strength or correlation value, which is measured by the measuring unit, with a predetermined threshold value; a storing unit for storing the information about the particular channel having the signal strength or correlation value, which is larger than the predetermined threshold value; and a synchronization establishing unit for establishing synchronization based on the information stored in the storing unit.

A base station according to the present invention, which is a base station for use in a spread communication system having a particular channel for establishing synchronization, comprises: at least one transmitting unit for transmitting a spread signal on the particular channel over at least one carrier frequency by varying a transmission power; a measuring unit for measuring the number of mobile stations accommodated in the local station or the transmission qualities of the reception signals from the mobile stations; and a controlling unit for controlling the number of mobile stations accommodated in at least one frequency by variably controlling the transmission power of the spread signal on the particular channel, which is accommodated in at least one frequency.

A system according to the present invention, which is a spread communication system having a particular channel for establishing synchronization, comprises: a base station having a capability for controlling the transmission power level of the spread signal portion for establishing synchronization on the particular channel; and a mobile station having a capability for selecting a base station to be accessed according to the transmission power level of the received spread signal portion for establishing synchronization on the particular channel.

According to the present invention, even if a communication service using a plurality of frequencies is provided, a mobile station can select a channel at a suitable frequency, and access a base station in a spread communication system.

Additionally, the base station can control the frequency which the mobile station subscribes by variably controlling the transmission power of a spread signal when transmitting the spread signal on a particular channel for establishing synchronization, and can suitably allocate mobile stations to a plurality of frequencies. Furthermore, a certain base station increases the transmission power more than that in a different base station, so that a mobile station accessing the different base station can be accommodated by the certain base station. As a result, mobile stations can be suitably distributed and allocated to respective base stations without imposing a heavy load on only one base station.

BRIEF DESCRIPTION OF THE DRAWINGS

FIG. 3 shows one example of a rectifying circuit shown in FIG. 1;

FIG. 6 exemplifies the configuration of a square amplitude calculating circuit;

FIG. 13 shows the mobile station according to the seventh preferred embodiment (No. 3);

DESCRIPTION OF THE PREFERRED EMBODIMENTS

Figure 2:
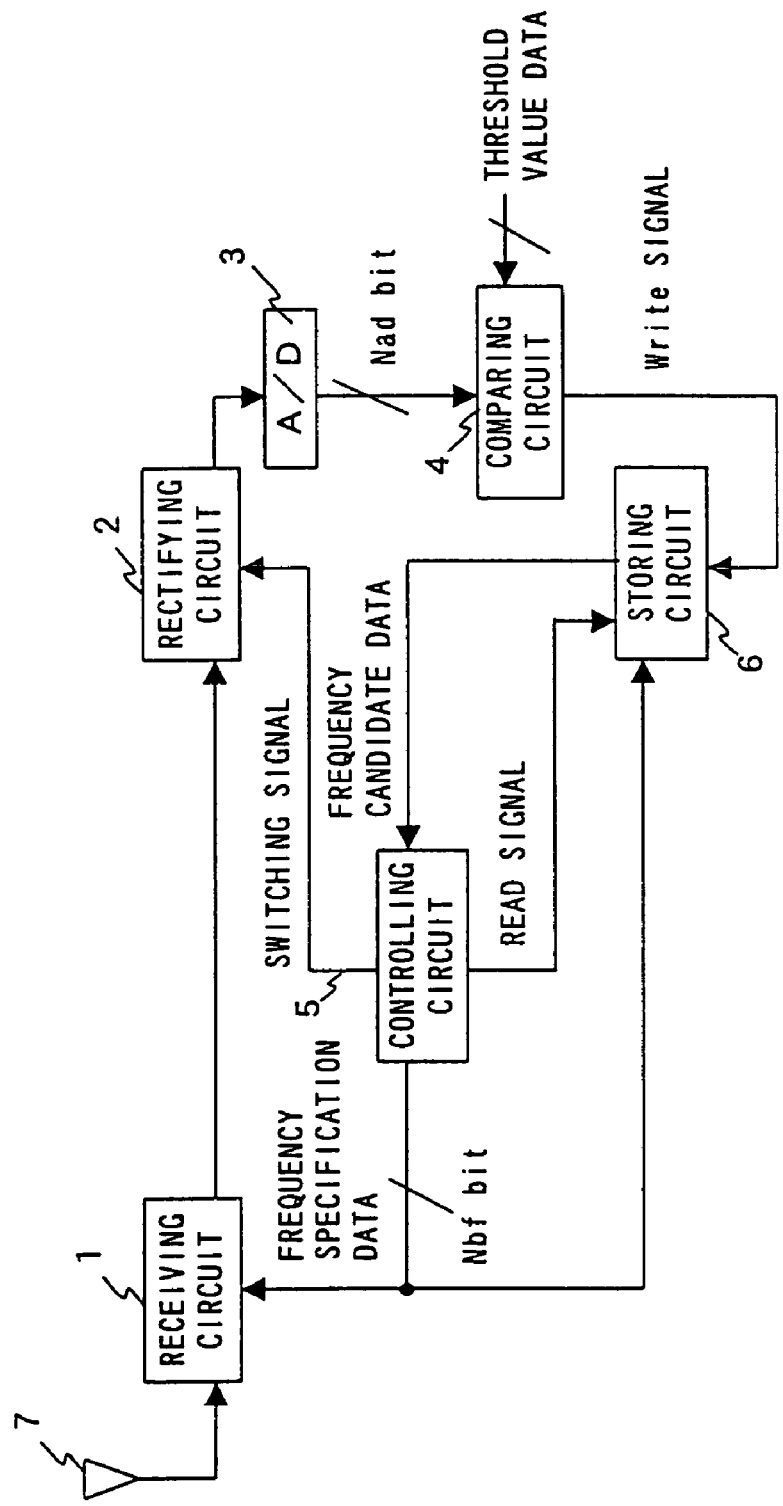
FIG. 2 is a block diagram showing the configuration of a mobile station according to a first preferred embodiment of the present invention.

FIG. 2 is a block diagram showing the configuration of a mobile station according to a first preferred embodiment of the present invention.

In this preferred embodiment, the presence/absence of a carrier wave is initially determined for all of carrier frequencies. Then, whether or not an available perch channel exists is determined in each of the carrier frequencies by measuring the strength of a reception signal at each of the carrier frequencies, and by comparing the measured strength with a predetermined threshold value. If an available perch channel is determined to exist only in some of the carrier frequencies at this state, the time taken to despread the frequencies where no necessary signal exists can be saved by making a cell search for those carrier frequencies.

The signal received by an antenna 7 is input to a receiving circuit 1. The receiving circuit 1 includes a frequency converting circuit and a local oscillator, which are not shown in this figure. The frequency converting circuit converts the cyclic signal output from the local oscillator into the frequency specified by an externally input digital signal, so that the locally oscillated signal that the receiving circuit 1 requires to receive a signal can be varied. The receiving circuit 1 is intended to convert the signal received by the antenna 7, for example, into a baseband signal, and to output the baseband signal. The signal received by the receiving circuit 1 is an analog signal, and is input to a rectifying circuit 2. The rectifying circuit 2 includes a switch. The rectifying circuit 2 turns off the switch in a cyclic time period during which perch channel signals arrive, and turns on the switch at the end of the cyclic time period to emit the electric charge of the input analog signals, which is accumulated in an internally arranged capacitor. Namely, the analog signals which are received by the antenna 7 and output from the receiving circuit 1 are integrated by the rectifying circuit 2. The average value of the signals received during the perch channel signal cyclic time period can be obtained if the integrated value output from the rectifying circuit 2 is divided by the time (the cyclic time period) taken to integrate the signals. However, the integrated value itself is used to simplify the circuit configuration here. The integrated value output from the rectifying circuit 2 is A/D-converted by an A/D converter 3. The digital signal obtained by the A/D conversion is compared with a predetermined threshold value by a comparing circuit 4. The output of the comparing circuit 4 becomes "1" when a digital signal exceeding the threshold value is obtained. The signal indicating the value "1" is input to a storing circuit 6 as a Write (Write-enable) signal, so that the frequency data input to the receiving circuit 1 at this time is stored in the storing circuit 6. This frequency data is provided to the storing circuit 6 as an Nbf-bit signal from a controlling circuit 5.

The controlling circuit 5 stores the frequencies of a plurality of perch channels beforehand, and specifies the frequency of the perch channel to be frequency-detected for the receiving circuit 1 with frequency specification data. The receiving circuit 1 receives the perch channel signal having the frequency specified by the controlling circuit 5. The receiving circuit 1 converts the signal having the specified frequency, for example, into a baseband signal, and outputs the baseband signal to the rectifying circuit 2. The rectifying circuit 2 integrates the signals input from the receiving circuit 1 during the perch channel signal cyclic time period by turning on/off the internal switch with the signal (switching signal) instructing the cyclic time period timing. As described above, the output of the rectifying circuit 2 is A/D-converted by the A/D converter 3, and is input to the comparing circuit 4 as an Nad-bit digital signal in order to be compared with a threshold value. If the numeric value represented by the Nad bits is larger than the threshold value as a result of the comparison, a Write signal is applied to the storing circuit 6, so that the Nbf-bit frequency specification data input from the controlling circuit 5 is stored.

The controlling circuit 5 applies a Read signal to the storing circuit 6, reads the Nbf-bit frequency data candidate from the storing circuit 6, sets the read data in the receiving circuit 1, and makes a cell search.

All of the outputs of the controlling circuit 5 and the frequency specification data may be stored in the storing circuit 6 without making the above described comparison with the threshold value. Additionally, the output of the rectifying circuit 2 is compared with the threshold value of an analog voltage by an analog comparator, so that the result of the comparison may be used as a Write signal to the storing circuit. Furthermore, the output of the A/D converter 3 is compared with a threshold value by a CPU, etc., so that a frequency candidate data may be selected.

Note that the configuration for making a cell search is not shown in FIG. 2 although the controlling circuit 5 obtains frequency candidate data for making a cell search. Because a conventional method can be used as the cell search method and a known technique can be also used as the hardware configuration, a cell search configuration is not particularly shown. Accordingly, the cell search method and the hardware configuration implementing this method are not particularly referred to in the explanations to be provided about the preferred embodiments.

FIG. 3 shows one example of the rectifying circuit shown in FIG. 2.

This rectifying circuit is implemented by adding a switch 10 to a general bridge-type full-wave rectifying circuit 9. The signal input from an input terminal 8 is rectified by a bridge 9a and a capacitor 9b. Particularly, in this preferred embodiment, the switch 10 is arranged and turned off during the perch channel signal cyclic time period. The electric charge of the rectified signal is accumulating in the capacitor 9b during this time period. The operation for accumulating the electric charge of a rectified signal in the capacitor 9b corresponds to the above described signal integration. The rectifying circuit may be configured by using a half-wave rectifying circuit although FIG. 3 exemplifies the configuration using the full-wave rectifying circuit.

Figure 4:
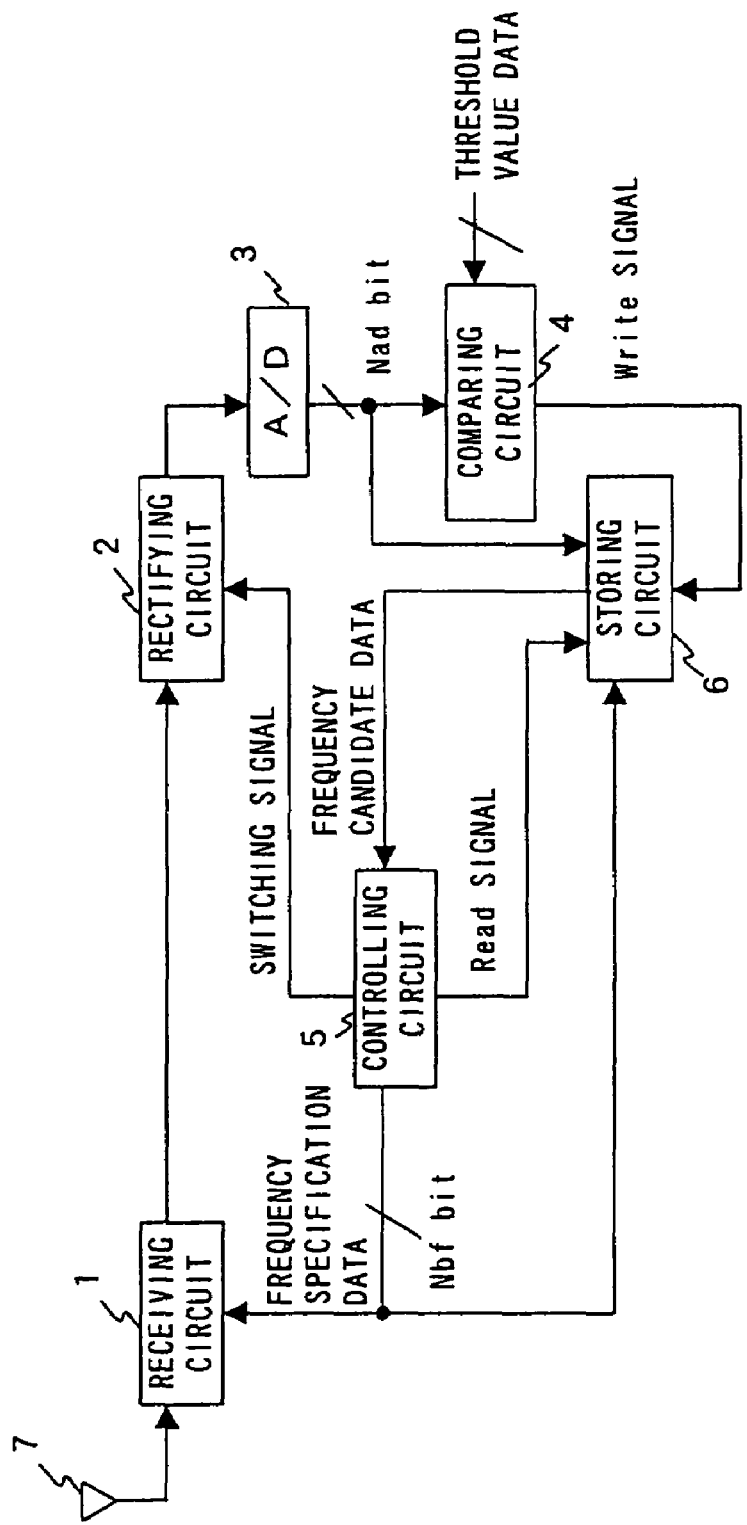
FIG. 4 is a block diagram showing the configuration of a mobile station according to a second preferred embodiment of the present invention.

FIG. 4 is a block diagram showing the configuration of a mobile station according to a second preferred embodiment of the present invention.

In this figure, the same constituent elements as those shown in FIG. 2 are denoted by the same reference numerals.

According to this preferred embodiment, if a signal available for a plurality of carrier frequencies is determined to exist, a cell search is made for the frequency at which the strength of the signal becomes a maximum among the carrier frequencies where the signal exists. After the above described process at the first stage is terminated, the cell search for a single frequency is made in descending order of the strength of the signal.

Namely, a receiving circuit 1 to which Nbf-bit frequency specification data is input from a controlling circuit 1 performs frequency conversion for the signal having the frequency specified by this input, and outputs the signal obtained by the conversion to a rectifying circuit 2. The rectifying circuit 2 rectifies the input signal from the receiving circuit 1 based on the switching signal input from the controlling circuit 5, and integrates the signal obtained by the rectification during a perch channel signal cyclic time period. The result of the integration is input to an A/D converter 3. After the signal is converted into a digital signal, it is input as an Nad-bit digital signal to a comparing circuit 4 and also to a storing circuit 6. If the integrated value of the rectifying circuit 2 is larger than a threshold value as a result of the comparison made by the comparing circuit 4, a Write signal is input from the comparing circuit 4 to the storing circuit 6. The Nbf-bit frequency specification data output from the controlling circuit 5 and the Nad-bit signal value obtained by digitizing the integrated value of the rectifying circuit 2 are corresponded and stored in the storing circuit 6.

The controlling circuit 5 shown in FIG. 4 reads the frequency data corresponding to the maximum integrated value data from the storing circuit 6, and makes a conventional cell search for a single frequency. In this case, the controlling circuit 5 references the integrated value data stored in the storing circuit 6, searches for the maximum integrated value data, and obtains the frequency specification data stored in correspondence with the maximum integrated value data. Then, the controlling circuit 5 makes the conventional cell search for a single frequency for the frequency specified by this frequency specification data. Additionally, in the configuration shown in FIG. 4, a method for obtaining a predetermined number of pieces of frequency specification data from the storing circuit 6 in descending order of an integrated value, and for individually making the conventional cell search for a single frequency for the plurality of frequency specification data, may be used other than the method for using the maximum frequency data as a cell search target. By selecting a predetermined number of frequencies in descending order of an integrated value as described above, processing time can be significantly reduced compared with the case where a cell search is made for all of stored frequencies. Explanation about the conventional cell search method for a single frequency is omitted here.

Figure 5:
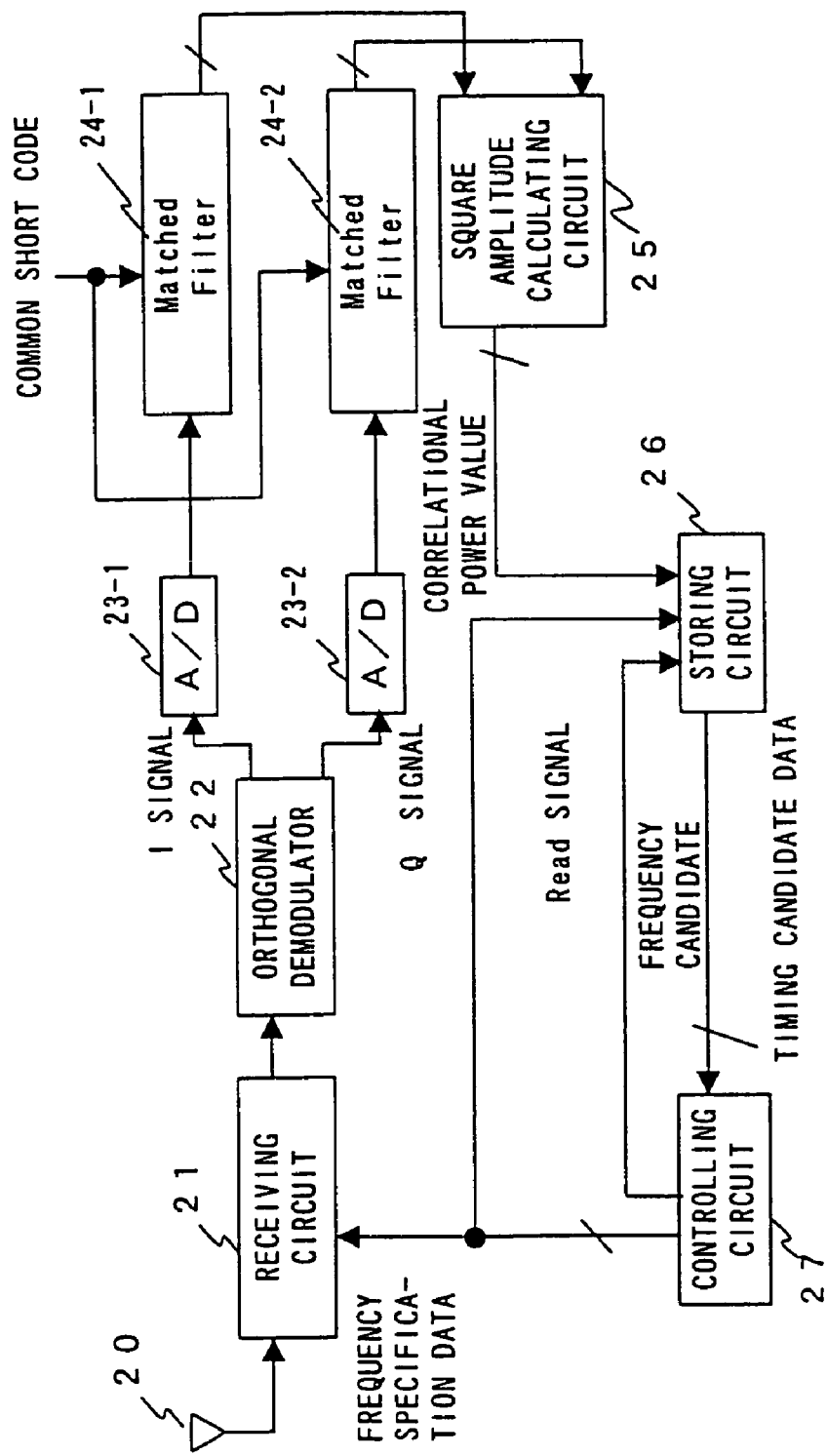
FIG. 5 is a block diagram showing the configuration of a mobile station according to a third preferred embodiment of the present invention.

FIG. 5 is a block diagram showing the configuration of a mobile station according to a third preferred embodiment of the present invention.

According to this preferred embodiment, after the timing-correlational square amplitude calculation between the output of the receiving circuit 21 and a common short code is made, and a cell search is made based on this data. Here, the timing-correlational square amplitude calculation means the acquisition of correlation values obtained by matched filters, and the information about the timing at which a common short code and a demodulation signal are multiplied.

A receiving circuit 21 includes a frequency converting circuit (not shown), and can set a locally oscillated frequency with externally input data by using the frequency converting circuit. The receiving circuit 21 generates the signal having the corresponding frequency based on the frequency specification data provided by a controlling unit 27, and converts the frequency of the signal received by an antenna 20 by using this locally oscillated signal. For example, an RF band signal received by the antenna 20 is converted into an IF band signal. Then, the signal whose frequency is converted by the receiving circuit 21 is input to an orthogonal demodulator 22, where the signal is demodulated into an I and Q signals being orthogonal signals. Then, the I and Q signals are respectively converted into digital signals by A/D converters 23-1 and 23-2, and input to matched filters 24-1 and 24-2. The common short code of the perch channel signal to be cell-searched is input to the matched filters 24-1 and 24-2, which respectively calculate and output the correlation values between the common short code and the converted digital I and Q signals. A square amplitude calculating circuit 25 is a circuit which calculates the square of the distance from the coordinate origin of the complex number value on a complex plane, by recognizing the correlation values output from the matched filters 24-1 and 24-2 to be the real and imaginary number parts of a complex number (for example, respectively recognizes the correlation values between the common short code and the I signal and between the common short code and the Q signal to be a real and imaginary number parts), and outputs the calculated value. The output of the square amplitude calculating circuit 25 is stored in the storing circuit 26 as a correlational power value along with the frequency specification data output from the controlling unit 27. The controlling unit 27 reads the stored data from the storing circuit 26 by providing a Read signal to the storing circuit 26, and selects a frequency and timing candidates from the stored data. A correlation value is stored in the storing circuit 26 each time the matched filters 24-1 and 24-2 multiply a common short code at a different timing. Therefore, the timing candidate can be determined based on a memory location in the storing circuit 26 according to the correspondence between frequency and timing.

FIG. 6 exemplifies the configuration of the square amplitude calculating circuit 25.

When the correlation values are obtained respectively for the I and Q signals which are orthogonally demodulated by the orthogonal demodulator 22, the correlation values are respectively input to multipliers 28-1 and 28-2 as inputs 1 and 2. The inputs 1 and 2 are branched and respectively input to the multipliers 28-1 and 28-2. Then, the inputs 1 and 2 are respectively squared by the multipliers 28-1 and 28-2, and input to an adder 29, which adds these values. As a result, a correlation power value $I^2+Q^2$ is output from the adder 29 based on the assumption that the values of the inputs 1 and 2 are respectively represented as I and Q.

Figure 7:
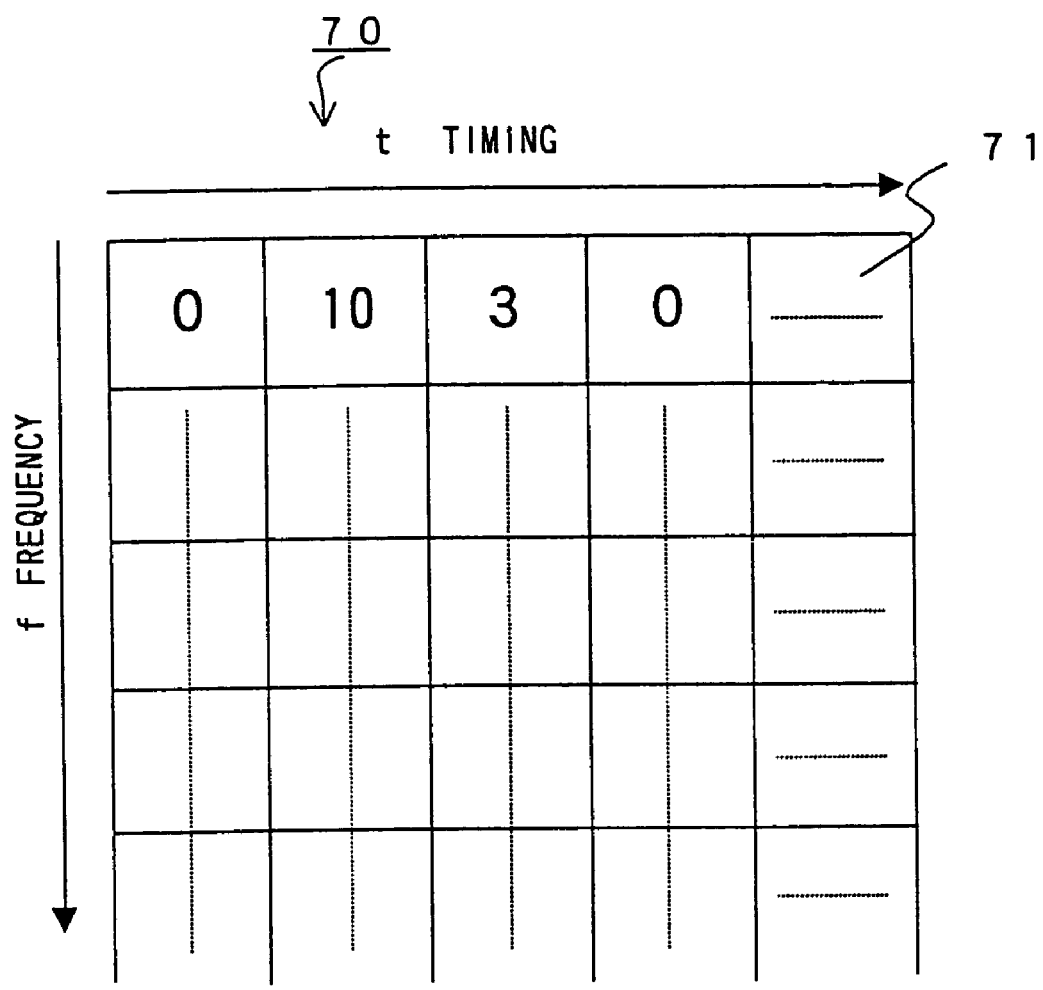
FIG. 7 exemplifies the format of data stored in a storing circuit 6 shown in FIG. 4.

FIG. 7 exemplifies the storage format of the data stored in the storing circuit 26 shown in FIG. 5.

In the storing circuit 26 shown in FIG. 5, data items such as a correlational power value, a timing candidate, and a frequency candidate are stored. The format shown in FIG. 7 exists as the storage format for efficiently storing these data items from an access or capacity viewpoint. In this figure, a correlational power value is stored in each cell 71 in a two-dimensional table 70. Each column in the table 70 corresponds to each specification frequency "f", while each row in the table 70 corresponds to each timing candidate "t". The timing candidate "t" is the timing at which a common short code is multiplied by a demodulation signal. Normally, when a spread code is provided, a matched filter sequentially outputs a correlation value while shifting the multiplication timing of a spread code in synchronization with the clock of a receiving device. Accordingly, the multiplication timing of a spread code, that is, a timing candidate, can be identified at the timing of the clock within a receiving device by storing in which order a correlation value is output.

Therefore, a correlational power value is stored in the cell at the intersection point of the multiplication timing (timing candidate) when the correlational power value is obtained and a specification frequency. By arranging the storing circuit 26 as the table 70, only correlational power values may be stored therein. Furthermore, a column and row addresses respectively become frequency specification data (a frequency candidate) and multiplication timing (a timing candidate) when a correlation power value is written/read to/from the storing circuit 26.

Figure 8:
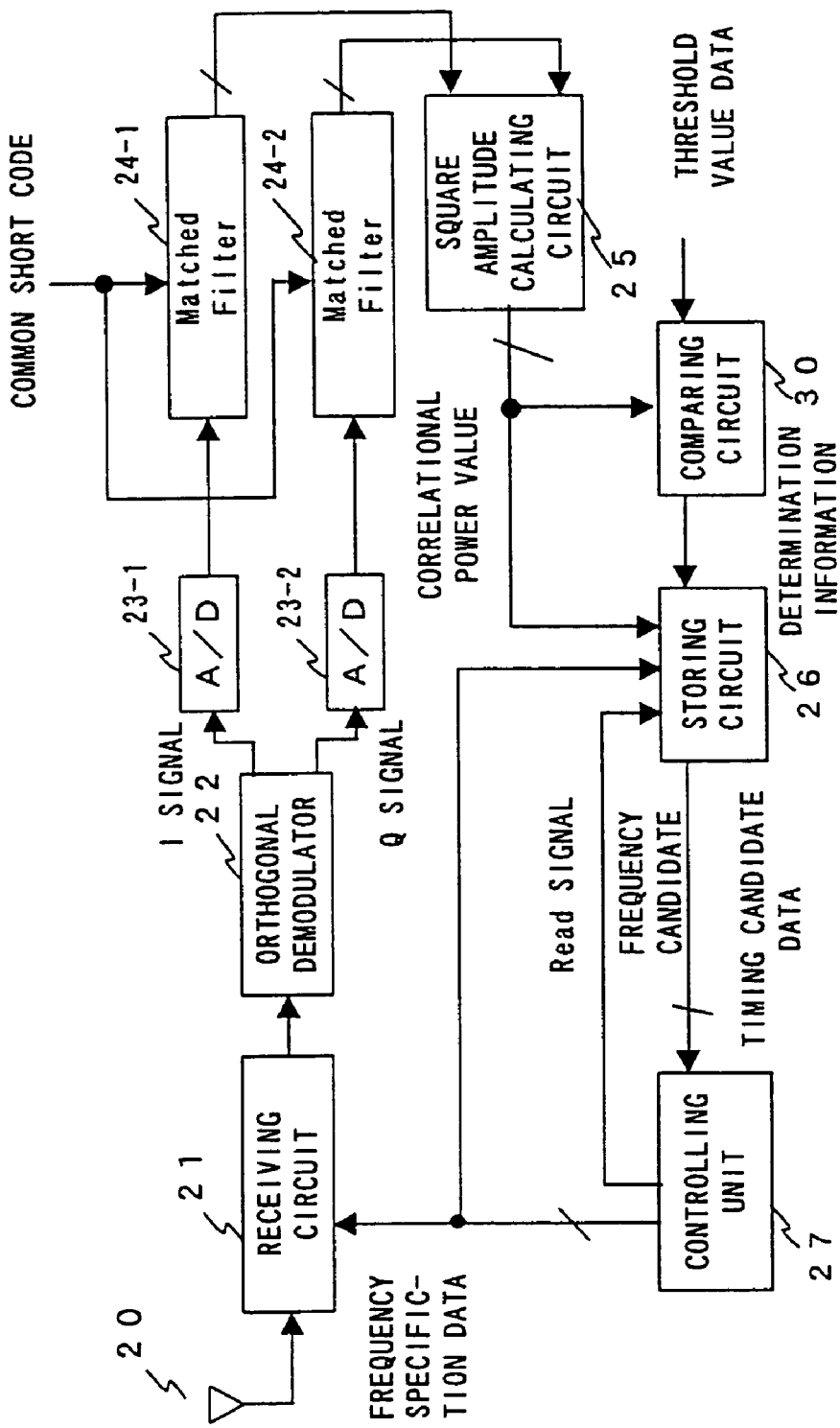
FIG. 8 is a block diagram showing the configuration of a mobile station according to a fourth preferred embodiment of the present invention.

FIG. 8 is a block diagram showing the configuration of a mobile station according to a fourth preferred embodiment of the present invention.

In this figure, the same constituent elements as those shown in FIG. 5 are denoted by the same reference numerals.

The signal received by an antenna 20 is frequency-modulated to an IF band signal by a receiving circuit 21, and is input to an orthogonal demodulator 22. The orthogonal demodulator 22 demodulates the signal from the receiving circuit 21 into an I and Q signals, and respectively inputs them to A/D converters 23-1 and 23-2. The I and Q signals which are converted into digital signals are respectively input to matched filters 24-1 and 24-2, which respectively calculate the correlation values between the common short code and the I and Q signals. The correlation values of the I and Q signals which are respectively output from the matched filters 24-1 and 24-2 are input to a square amplitude calculating circuit 25. The square amplitude calculating circuit 25 calculates and outputs the total (correlational power value) of the squares of the correlation values between the common short code and the I and Q signals. The output of the square amplitude calculating circuit 25 is input to a storing circuit 26 and also to a comparing circuit 30. The comparing circuit 30 compares the output (correlational power value) of the square amplitude calculating circuit 25 with a predetermined threshold value. If the output of the square amplitude calculating circuit 25 is larger than the threshold value as a result of the comparison between the output of the square amplitude calculating circuit 25 and the threshold value, the output (determination information) of the comparing circuit 30 becomes "1". The value "1" is input to the storing circuit 26 as a Write signal, so that only the frequency specification data corresponding to the correlational power value exceeding the threshold value and the correlation power value are stored in the storing circuit 26.

Then, a controlling unit 27 reads the correlational power value and the frequency candidate (frequency specification data) corresponding thereto from the storing circuit 26, selects the timing corresponding to the correlational power value (correlational square amplitude calculation value), which becomes a maximum at each frequency, and makes a conventional cell search for a single frequency for the frequency candidate corresponding to this timing. Or, the controlling unit 27 may make a cell search by selecting the frequency of the maximum correlational square amplitude calculation value among all of the frequencies stored in the storing circuit 26 and its corresponding timing. The slot timing (the timing at which a common short code and a demodulation signal are multiplied), which corresponds to a correlational power value, can be known from the relationship between the operations of the matched filters 24-1 and 24-2 and the clock within the device by detecting in which order the correlation value is read out among the correlation values which are sequentially output from the matched filters 24-1 and 24-2.

According to this preferred embodiment, a threshold value determination is made, and the data about the frequency of a perch channel signal, which is considered to be valid, is stored in the storing circuit 26, so that the capacity of the storing circuit 26 and the operation amount of subsequent data processing (maximum value selection and sorting) can be reduced.

Figure 9:
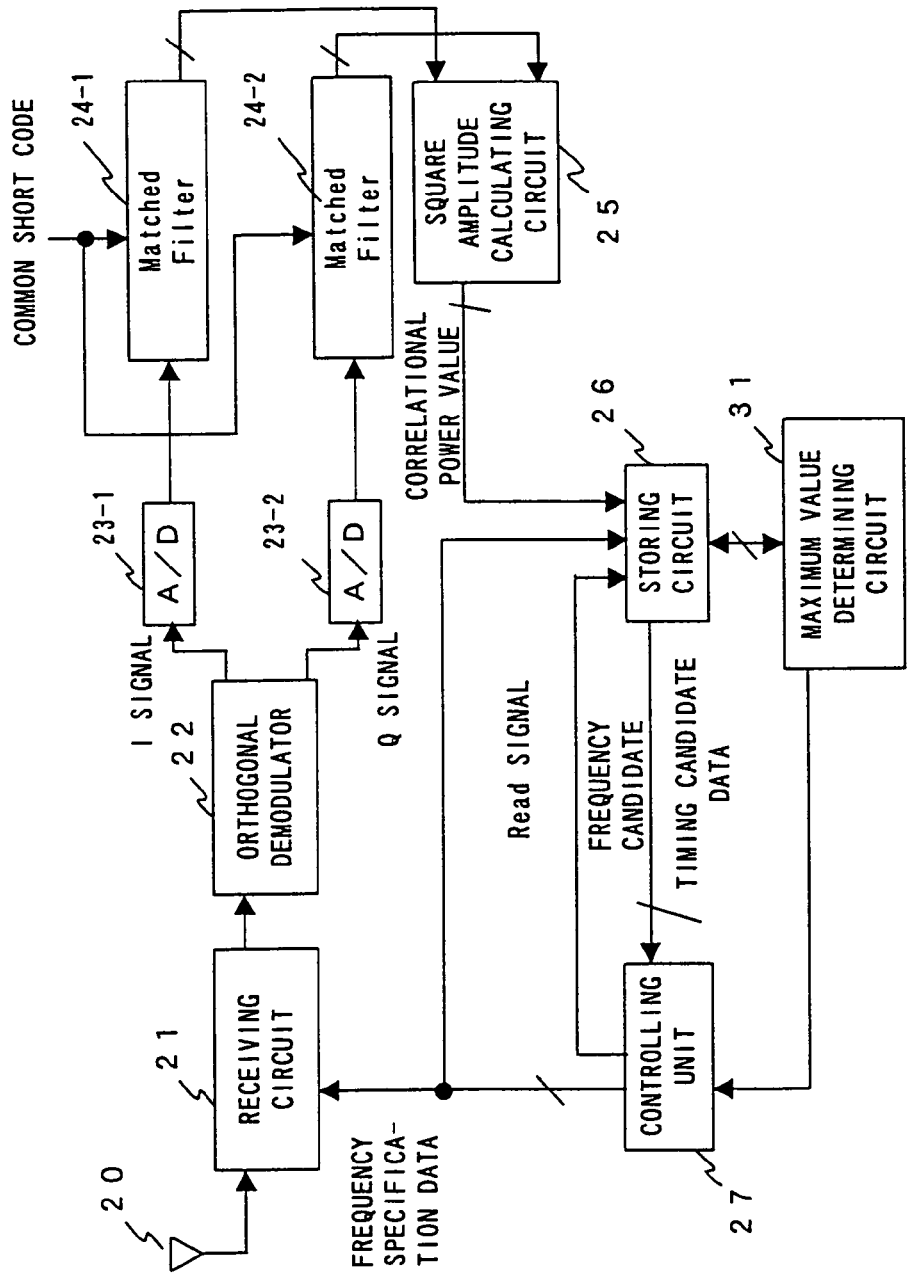
FIG. 9 is a block diagram showing the configuration of a mobile station according to a fifth preferred embodiment of the present invention.

FIG. 9 is a block diagram showing the configuration of a mobile station according to a fifth preferred embodiment of the present invention.

In this figure, the same constituent elements as those shown in FIG. 5 are denoted by the same reference numerals.

According to this preferred embodiment, the timing corresponding to the data of the maximum square amplitude calculation value is determined for each frequency among the data stored in a storing circuit 26. A maximum value determining circuit 31 may be implemented by software with a CPU. Additionally, the maximum value determining circuit 31 may select the timing corresponding to the maximum square amplitude calculation value at all of frequencies. Furthermore, the maximum value determining circuit 31 may calculate the data stored in the storing circuit 26 during a plurality of common short code cyclic time periods, obtain the averaged data in these cyclic time periods, and determine the maximum value among the averaged data.

The signal received by an antenna 20 is frequency-modulated to an IF band signal, and is demodulated by an orthogonal demodulator 22. After the demodulated I and Q signals are respectively converted by A/D converters 23-1 and 23-2, the correlation values between a common short code and the I and the Q signals are respectively calculated by matched filters 24-1 and 24-2. Then, the square amplitude calculation value (correlational power value) of the correlation values of the I and Q signals is obtained by a square amplitude calculating circuit 25, and the obtained value is stored in the storing circuit 26. In this preferred embodiment, a maximum value determining circuit 31 reads the frequency specification data and the correlational power value, which are stored in the storing circuit 26, independently from a controlling unit 27, and determines the frequency specification data (frequency candidate) corresponding to the maximum correlational power value. As the way of determining the correlational power value at this time, several methods exist as described above.

When the frequency candidate corresponding to the maximum correlational power value is determined by the maximum value determining circuit 31, the controlling unit 27 obtains the frequency candidate and the timing candidate, which correspond to the maximum correlational power value, from the storing circuit 26 by applying a Read signal to the storing circuit 26, and makes a cell search.

Figure 10:
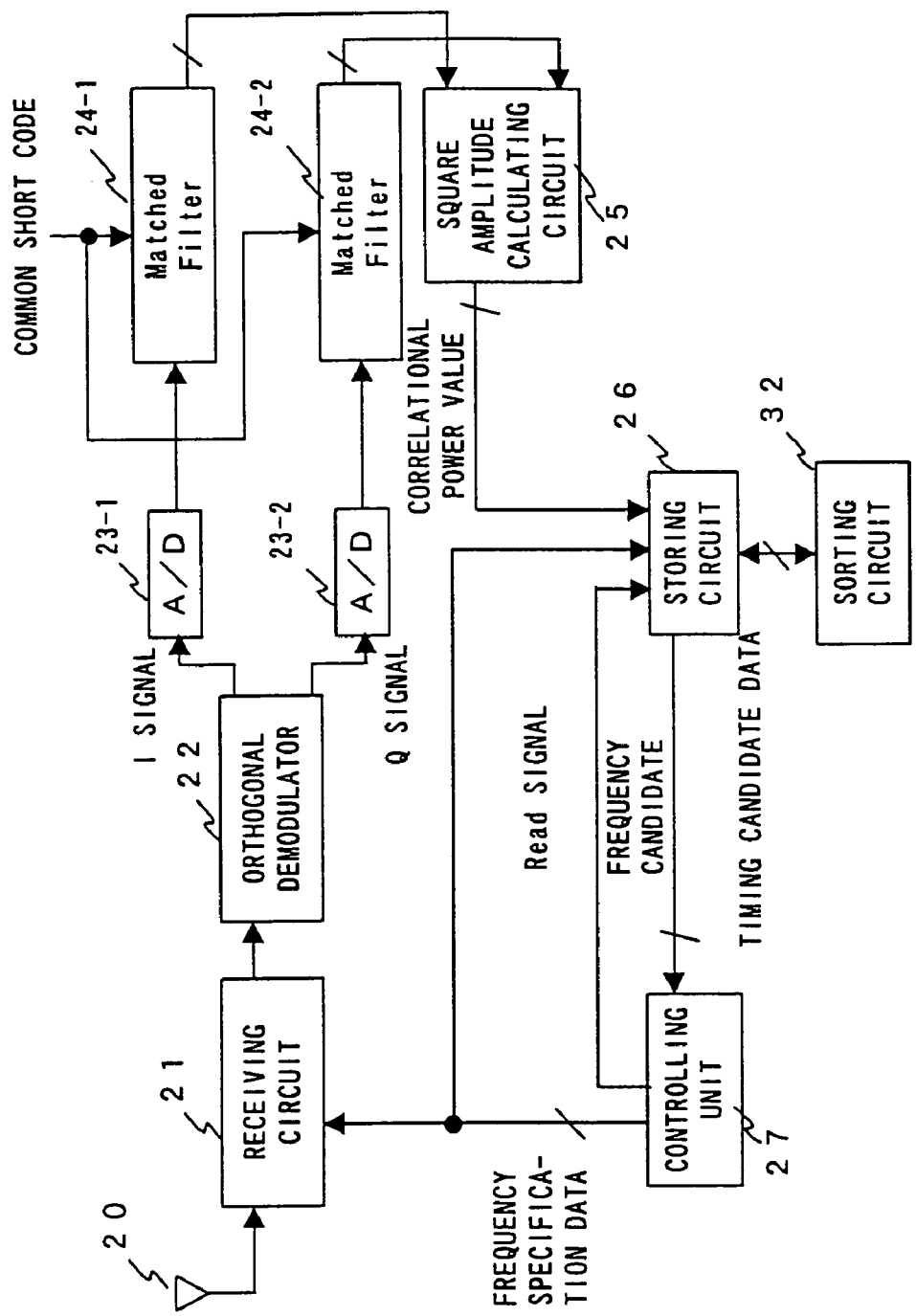
FIG. 10 is a block diagram showing the configuration of the mobile station according to a sixth preferred embodiment.

FIG. 10, is a block diagram showing the configuration of a mobile station according to a sixth preferred embodiment of the present invention.

In this figure, the same constituent elements as those shown in FIG. 9 are denoted by the same reference numerals.

According to this preferred embodiment, a cell search is made sequentially from the frequency and the timing, which correspond to larger correlational square amplitude operation value data, among the timing-correlational square amplitude calculation value data of all of frequencies.

In this preferred embodiment, the above described cell search capability may be implemented by software with a CPU having a sorting circuit 32 which rearranges data such as frequency candidates, timing candidates, etc., which are stored in a storing circuit 26, in descending order of a square amplitude calculation value. Additionally, data such as the frequencies, timing data, etc. stored in the storing circuit 26 may be rearranged after averaging the data during a plurality of common short code cyclic time periods also in this preferred embodiment.

The signal received by an antenna 20 is frequency-modulated to an IF band signal by a receiving circuit 21, and is demodulated by an orthogonal demodulator 22. The demodulated I and Q signals are respectively converted into digital signals by A/D converters 23-1 and 23-2, and the correlation values between a common short code and the I and Q signals are respectively calculated by matched filters 24-1 and 24-2. Then, the correlation values of the I and Q signals are squared by a square amplitude calculating circuit 25, and a correlational power value (correlational square amplitude calculation value) of the I and Q signals is calculated. The obtained value is stored in the storing circuit 26 along with its corresponding frequency specification data. The sorting circuit 32 searches for the correlational power values stored in the storing circuit 26, and rearranges the data within the storing circuit 26 in descending order of a correlational power values. Or, the sorting circuit 32 first searches the frequency data within the storing circuit 26, and rearranges the data having the same frequency in descending order of a correlational power value in a group of the data having the same frequency.

A controlling unit 27 obtains a frequency and timing candidates sequentially from the data having a larger correlational power value from the storing circuit 26 where the data are rearranged as described above, and makes a cell search.

Figure 11:
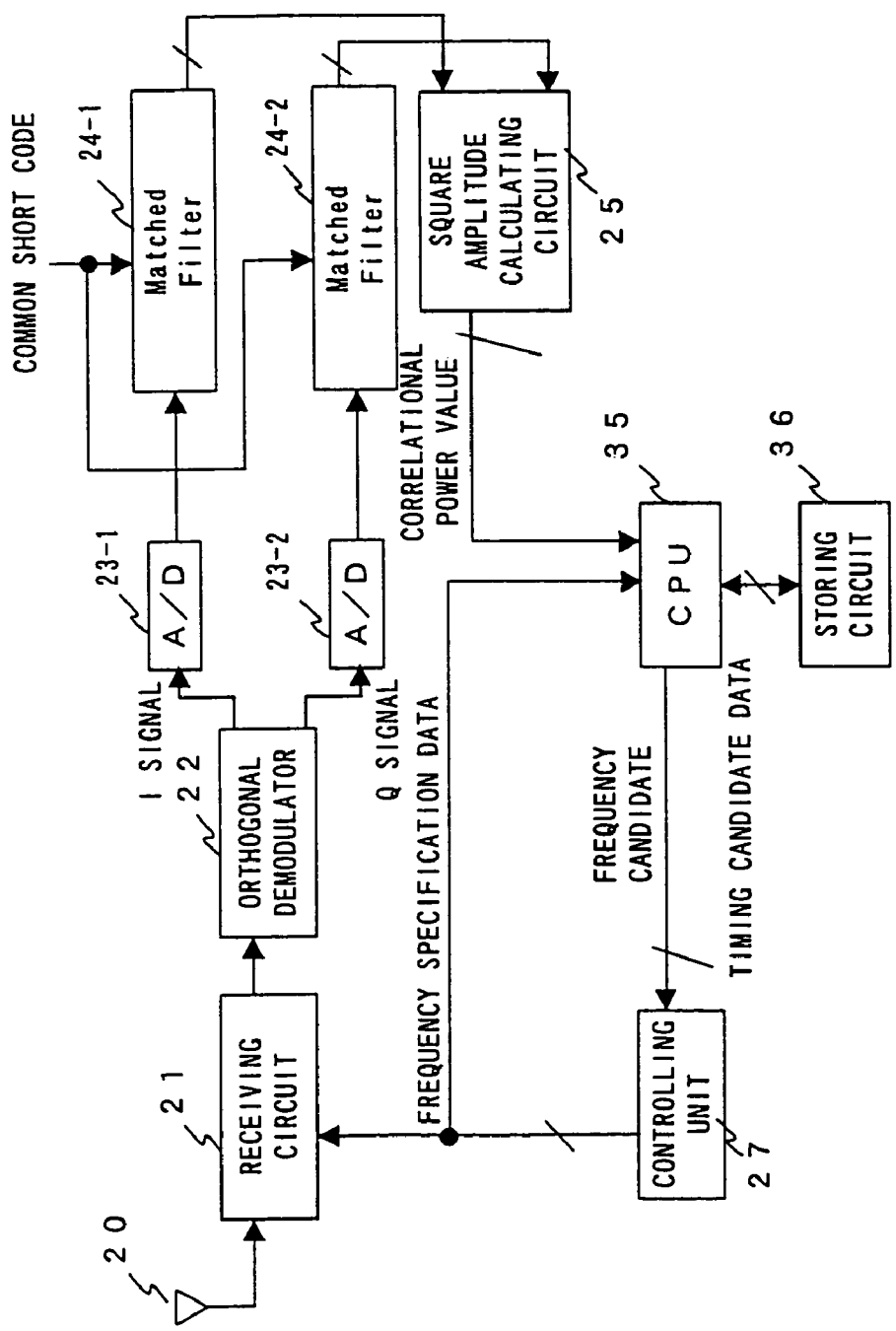
FIG. 11 shows a mobile station according to a seventh preferred embodiment of the present invention (No. 1)
Figure 12:
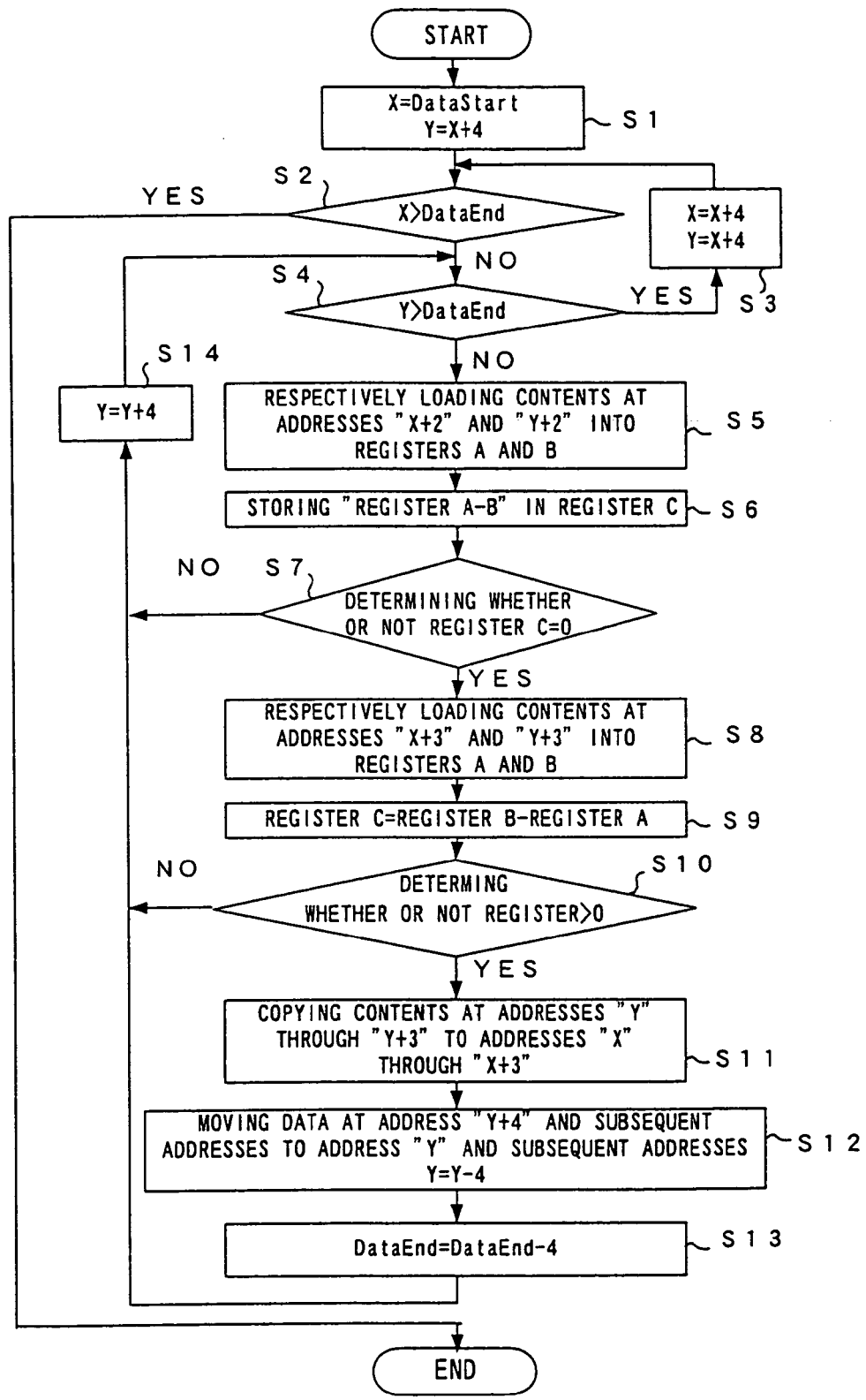
FIG. 12 shows the mobile station according to the seventh preferred embodiment of the present invention (No. 2)

FIGS. 11 through 13 show a mobile station according to a seventh preferred embodiment of the present invention.

Since signals in a plurality of carrier waves transmitted at the same power from one base station have almost the same attenuation characteristic, no difference is considered to be made whichever signal is adopted. Therefore, only the signal having the maximum correlational square amplitude calculation value is used for a comparison.

FIG. 11 exemplifies the configuration of the mobile station according to the seventh preferred embodiment.

In this figure, the same constituent elements as those shown in FIG. 10 are denoted by the same reference numerals.

The mobile station according to this preferred embodiment comprises a circuit for sorting the data of stored square amplitude calculation values, and a circuit for estimatingly classifying the data into respective base station data.

The sorting and the estimatingly-classifying capabilities are implemented by software with a CPU 35. However, these capabilities may be configured by hardware.

The signal received by an antennal 20 is frequency-modulated to an IF band signal, and demodulated into an I and Q signals by an orthogonal demodulator 22. After the demodulated I and Q signals are respectively converted into digital signals by A/D converters 23-1 and 23-2, they are input to matched filters 24-1 and 24-2. The correlation values between a common short code and the digital I and Q signals are calculated by the matched filters 24-1 and 24-2, and the calculation results are output to a square amplitude calculating circuit 25. The square amplitude calculating circuit 25 respectively calculates the square amplitudes for the correlation values of the I and Q signals, and calculates the correlational power value of the I and Q signals. The calculated correlational power value is transmitted to a CPU 35, which stores this value in a storing circuit 36. At the same time, a process to be described later is performed for this value. Additionally, the CPU 35 receives the frequency specification data corresponding to the correlational power value stored in the storing circuit 36 from a controlling unit 27, and stores this data in correspondence with the correlational power value.

After the CPU 35 performs a predetermined process, it outputs a frequency and timing candidates to the controlling unit 27 to make the controlling unit 27 perform a cell search.

FIG. 12 is a flowchart exemplifying the estimating-classification process executed by the CPU 35 shown in FIG. 11.

In this example, for the data having the same timing, only the data having the maximum correlational square amplitude calculation value is left and the remaining data is discarded. Note that this process may be performed after stored data is averaged in a plurality of common short code cyclic time periods.

FIG. 13 exemplifies the data arrangement in the storing circuit 36.

In the storing circuit 36, records, each of which is composed of data items such as a ranking, frequency data, timing (phase), and a correlational square amplitude calculation value, are stored in the form of a table. Each data item is composed of 1 word, and each record is composed of 4 words. Since one-word data is stored at one address in the storing circuit 36, a read/write operation can be made from/to each record in units of data items.

Here, the storage unit of each record is assumed to be referred to as an entry in the storing circuit 36. Additionally, as shown in FIG. 13, the entry address at which the first record of the storing circuit 36 is stored is assumed to be "DataStart", while the entry address at which the last record is stored is assumed to be "DataEnd".

In such a configuration, "N" records with the rankings 1 through "N" are stored in the respective entries addressed at "DataStart", "DataStart+4", "DataStart+8", . . . , "DataEnd".

The estimatingly-classifying process executed by the CPU 35 is explained by referring to FIGS. 12 and 13. Assume that records are rearranged in descending order of a correlational square amplitude calculation value as illustrated in FIG. 13 before the process shown by the flowchart of FIG. 12 is executed. Also this process is performed by the CPU 35. After the process of the flowchart shown in FIG. 12 is performed, desired records are arranged in descending order of a correlational square amplitude calculation value at addresses "DataStart" to "DataEnd+3". Also this arrangement process is performed by the CPU 35. As a matter of course, data arranged in ascending order can be generated.

First, suppose that the records are stored in the storing circuit 36 in the form shown in FIG. 13.

In FIG. 12, the entry address "DataStart" of the first record with the ranking 1, which is stored in the storing circuit 36, is assigned to a variable "X", in step S1. Additionally, the entry address of the next record with the ranking 2 among the records shown in FIG. 13 is assigned to a variable "Y". In step S2, it is determined whether or not the variable "X" is larger than a variable "DataEnd", that is, whether or not the process is performed for the records in all the entries. If the determination results in "YES" in step S2, it means that the process is completed for the records in all the entries. Therefore, the process is terminated. If the determination results in "NO" in step S2, a record to be processed is left. Therefore, the flow goes to step S4, where it is determined whether or not the variable "Y" is larger than the variable "DataEnd". This is intended to determine that the variable "Y" indicating the entry address of the record to be compared with the record having the entry address equal to the variable "X" exceeds "DataEnd", that is, no record to be compared is left in the storing circuit 36. If the determination in step S4 results in "YES", a record to be compared reaches the last entry. Therefore, the variable "X" indicating the entry address of the record at the comparison source is incremented by 4, and the value of the variable "Y" is set to a value which is larger than the updated value of the variable "X" by 4 (step S3). Control then transfers to the next entry record, that is, the process of the timing set in the record. If the determination results in "NO" in step S4, the contents of the addresses (X+2) and (Y+2) are respectively loaded into registers A and B. Each of the addresses "X" and "Y" indicates the address at which the data item of the ranking of each record is stored. The address of each entry, to which "2" is added, indicates the address at which the data item of the timing of each record is stored. Accordingly, timing data of each record to be compared is loaded into the registers A and B. In step S6, the value obtained by (register A-register B) is stored in a register C. Then, it is determined whether or not the content of the register C is "0" in step S7. That is, it is determined whether or not the timing data of the two records are the same. This determination is based on the following consideration. If signals are transmitted from the same base station, their timing are estimated to be the same even if their frequencies are different. That is, the data at the same timing are those transmitted from the base station. Therefore, it is sufficient to leave any one of the data.

If the determination results in "NO" in step S7, the signals are not the ones transmitted from the same base station. The flow therefore goes to step S14 where the entry address of the record to be compared is changed to the next entry address. The flow then goes back to step S4, and the above described process is repeated. If the determination results in "YES" in step S7, it means that the timing data of the two records are the same. Accordingly, it is judged that the signals are transmitted from the same base station, and either of them may be left. The flow then goes to step S8 where the contents at the addresses "X+3" and "Y+3" are respectively loaded into the registers A and B. In step S9, the value obtained by (register B-register A) is stored in the register C. In step S10, it is determined whether or not the register C is larger than "0". This is intended to determine which of the correlational square amplitude calculation values of the records at the two entry addresses "X" and "Y" is larger. Namely, this is based on the consideration such that it is sufficient to store the signal of a larger correlational square amplitude calculation value.

If the determination results in "NO" in step S10, the correlational square amplitude calculation value of the record at the entry address "X" at the comparison source is larger. Therefore, the record at the comparison destination "Y" is changed. Namely, the flow goes to step S14 where the value of the variable "Y" is incremented by 4 in order to read the record in the succeeding entry from the storing circuit 36 by setting Y=Y+4. The flow goes back to step S4, and the above described process is repeated. If the content of the register C is larger than "0" in step S10, the correlational square amplitude calculation value of the record to be compared with "X" is larger. Therefore, the records stored at the addresses "X" through "X+3" are rewritten to be those at the addresses "Y" through "Y+3". As a result, the records originally stored at the addresses "X" through "X+3" are overwritten and erased. Next, the records at the address Y+4 and the subsequent addresses are moved ahead to the address Y and the subsequent addresses, Namely, since the records previously stored at the addresses "X" through "X+3" are erased, the storage locations of the records at the address "Y" and the subsequent addresses are moved ahead by 1 entry. AT the same time, the records at the address "Y" and the subsequent addresses "Y+3" are overwritten to prevent the identical data from existing duplicately. In step S13, "4" is subtracted from the variable "DataEnd" indicating the last entry address of the latest storage records. After the process in step S14 is performed, the flow goes back to step S4 and the above described process is repeated. The process in step S13 is intended to move ahead also the entry address of the last record in correspondence with the process for overwriting and erasing the records at the addresses "X" through "X+3", and the process for moving ahead the storage locations of the records at the address "Y" and the subsequent addresses by 1 entry, which is performed in step S12.

With the above described processes, only the record having the maximum correlational square amplitude calculation value is left sequentially from the timing data having a larger correlational square amplitude calculation value, and the remaining records are sequentially deleted. Finally, only the record in which the maximum correlational square amplitude calculation value is set is stored for each timing data in the storing circuit 36. Additionally, these records are stored in descending order of a maximum correlational square amplitude calculation value.

In the example shown in FIG. 13, for the records having the timing "50", the record at the entry address "DataStart" is left, and the records at the entry addresses "DataStart+4" and "DataStart+8" are deleted. Additionally, for the record having the timing "75", the record stored at the entry address "DataStart+12" is left and the other record is deleted. Then, the record stored in the entry at the address "DataStart+12" is stored in the entry at the address "DataStart+4". The records having the maximum correlational square amplitude calculation value for each timing, which are not shown in this figure, are moved ahead also in the respective entries at the address "DataStart+8" and the subsequent addresses.

The process shown in the above described flowchart is merely one example. A plurality of methods for determining whether or not the record stored in the storing circuit 36 is the record of the signal from the same base station, can be considered. For example, an arbitrary entry record may be deleted using a random number without leaving a larger correlational square amplitude calculation value when the record of the signal from the same base station is deleted.

Figure 14:
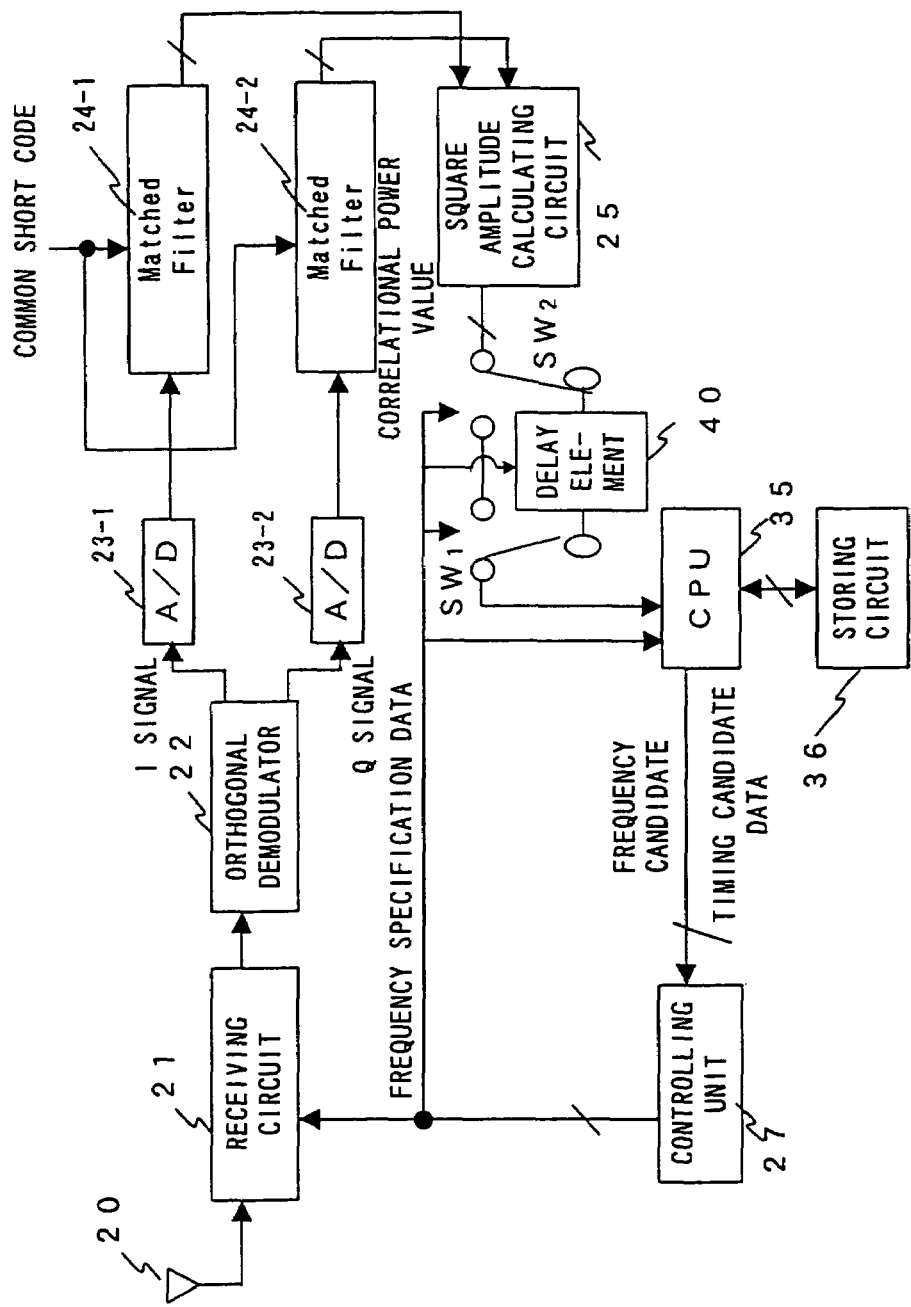
FIG. 14 shows a mobile station according to an eighth preferred embodiment of the present invention.

FIG. 14 is a block diagram showing the configuration of a mobile station according to an eighth preferred embodiment of the present invention.

In this figure, the same constituent elements as those shown in FIG. 11 are denoted by the same reference numerals.

Figure 1:
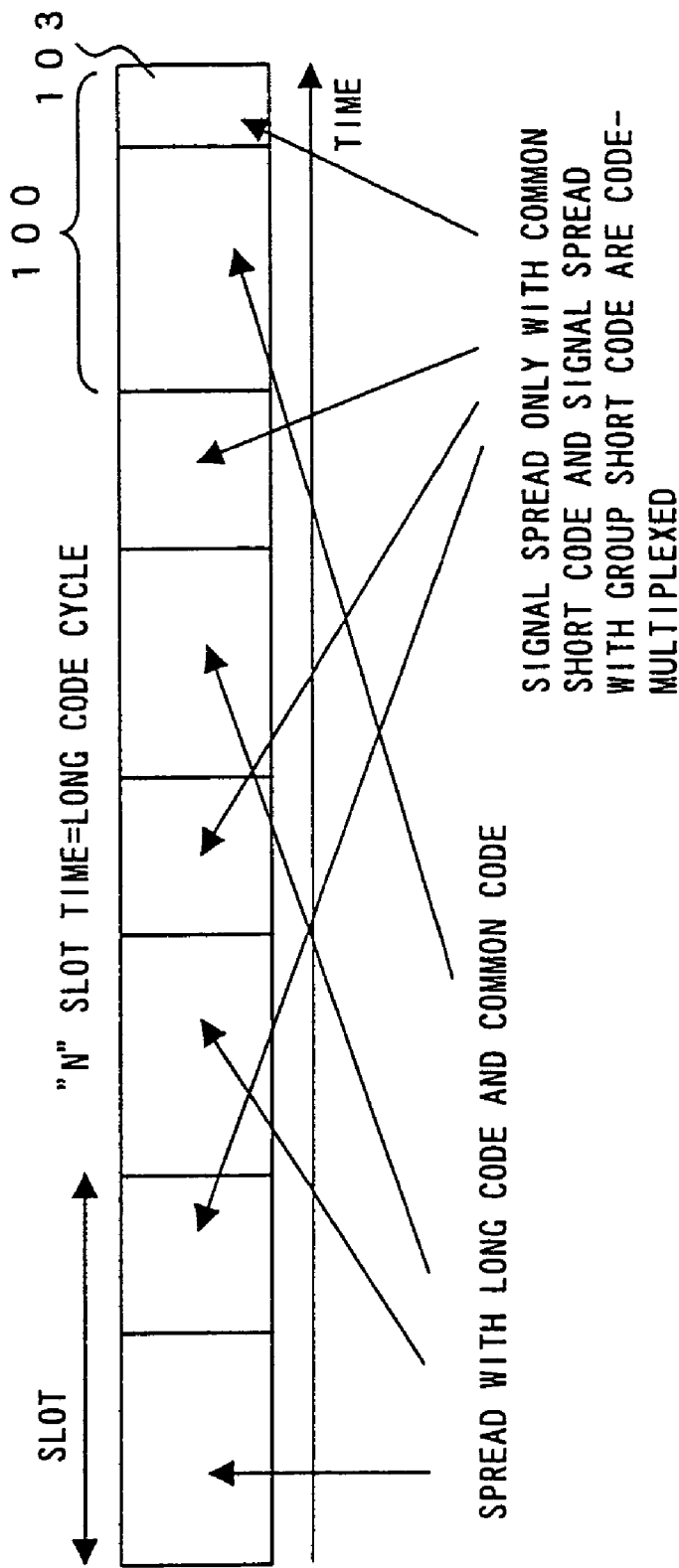
FIG. 1 shows one example of the format of a perch channel signal in a conventional CDMA cellular system.

This preferred embodiment is a configuration for easily realizing the capabilities of the seventh preferred embodiment on a mobile station side. That is, in the seventh preferred embodiment, its process is performed by estimating the signals transmitted from the same base station to have the same timing. Actually, however, the signals may have different timing at respective frequencies even if they are transmitted from the same base station. This preferred embodiment assumes the case where each base station shifts the phases of the common short codes in long code mask symbol parts of perch channel signals at respective carrier frequencies, by a predetermined value common to all of base stations (provides a delay to the frequencies). The long code-masked symbol part is the portion 103 which is spread with the common short code and the group short code of the perch channel signal 100 in FIG. 1. Since this portion 103 is not spread with a long code, that is, this portion 103 is in a state where spreading with a long code is maskted, it is referred to as the long code-masked symbol part.

Since the amount of a delay (a delay time?) provided between frequencies is predetermined in such a system, the amount of a delay to be provided to a received signal frequency can be decided by predetermining which frequency is received.

The signal received by an antenna 20 is received by a receiving circuit 21. A controlling unit 27 provides frequency specification data to a receiving circuit 21 and converts a particular frequency signal into an IF band signal. The converted IF band signal is input to an orthogonal demodulator 22, which demodulates the signal into an I and Q signals. After the I and Q signals are respectively converted into digital signals by A/D converters 23-1 and 23-2, they are input to matched filters 24-1 and 24-2. Then, the correlation values between a common short code and the digital I and Q signals are calculated by the matched filters 24-1 and 24-2. Then, the correlational power value based on the correlation values is calculated by a square amplitude calculating circuit 25. Frequency specification data is output from the controlling unit 27 to switches SW1 and SW2, which determine whether or not the output from the square amplitude calculating circuit 25 is input to a delay element 40 by using the frequency specified by the frequency specification data. Because the amount of a delay provided to respective carrier frequencies is predetermined at all base stations, the carrier frequency signal having a maximum delay is input to a CPU 35 without being passed through the delay element 40. The correlational power values of other carrier frequency signals are input to the delay element 40 by turning on/off the switches SW1 and SW2, so that their delay amounts are cancelled. The frequency specification data output from the controlling circuit 27 is also input to the delay element 40. The delay element 40 determines how much the currently selected carrier frequency signal is delayed from the carrier frequency signal having the maximum delay, and changes the timing at which the correlational power value output from the square amplitude calculating circuit 25 is input to the CPU 35 based on this determination in order to adjust the amount of a delay from the signal having the maximum delay to be "0". Additionally, the frequency specification data is input to the CPU 35, and the records like those shown in FIG. 13 are stored in a storing circuit 35 in a similar manner as in the above described preferred embodiment.

As described above, all of the timing at which the correlation power values of respective carrier frequency signals transmitted from the same base station are input to the CPU 35 become identical even if the carrier frequencies are different. This is because the delay amounts of the respective carrier frequencies are cancelled. Accordingly, the data processing based on the estimation such that the input timing of the correlational power values of the signals transmitted from the same base station become identical, can be used when the data stored in the storing circuit 36 is processed, as referred to in the explanation about the seventh preferred embodiment. Namely, with the configuration according to this preferred embodiment, the process of the flowchart shown in FIG. 11 can be applied unchanged even if the signals transmitted from one base station have different timing at respective carrier frequencies.

The CPU 35 then passes a frequency and timing candidates of a perch channel signal to the controlling unit 27, and makes the controlling unit 27 perform a cell search.

In this preferred embodiment, the delay amounts of frequencies are corrected by using the switches SW1 and SW2 and the delay element 40. However, the delay correction is not limited to this configuration. Data delay amounts may be corrected by the software processing of the CPU 35 after correlational power values are once stored in the storing circuit 36.

By the way, the delay amounts (offset chip amounts include "0", that is, no delay (offset).

A preferred embodiment to be explained below is intended to prevent a new user from subscribing to a frequency at which traffic is heavy and to promote a new user to subscribe to a frequency at which traffic is light by combining the mobile station/cellular system according to the preferred embodiments explained so far, and a base station having a capability for obtaining the congested state of the traffic within a cell, and by changing the transmission powers of the frequencies at which their traffic are heavy and light. Additionally, since a user capacity is determined by an interference power between channels in a CDMA cellular system, this preferred embodiment can be used to suppress a new subscription when the interference power within a cell becomes equal to or higher than a predetermined level. If a single frequency cell suppresses a newly subscribing user when many frequency cells are controlled by one base station, the new user naturally subscribes to any of the other frequency cells which does not suppress new users.

Figure 15:
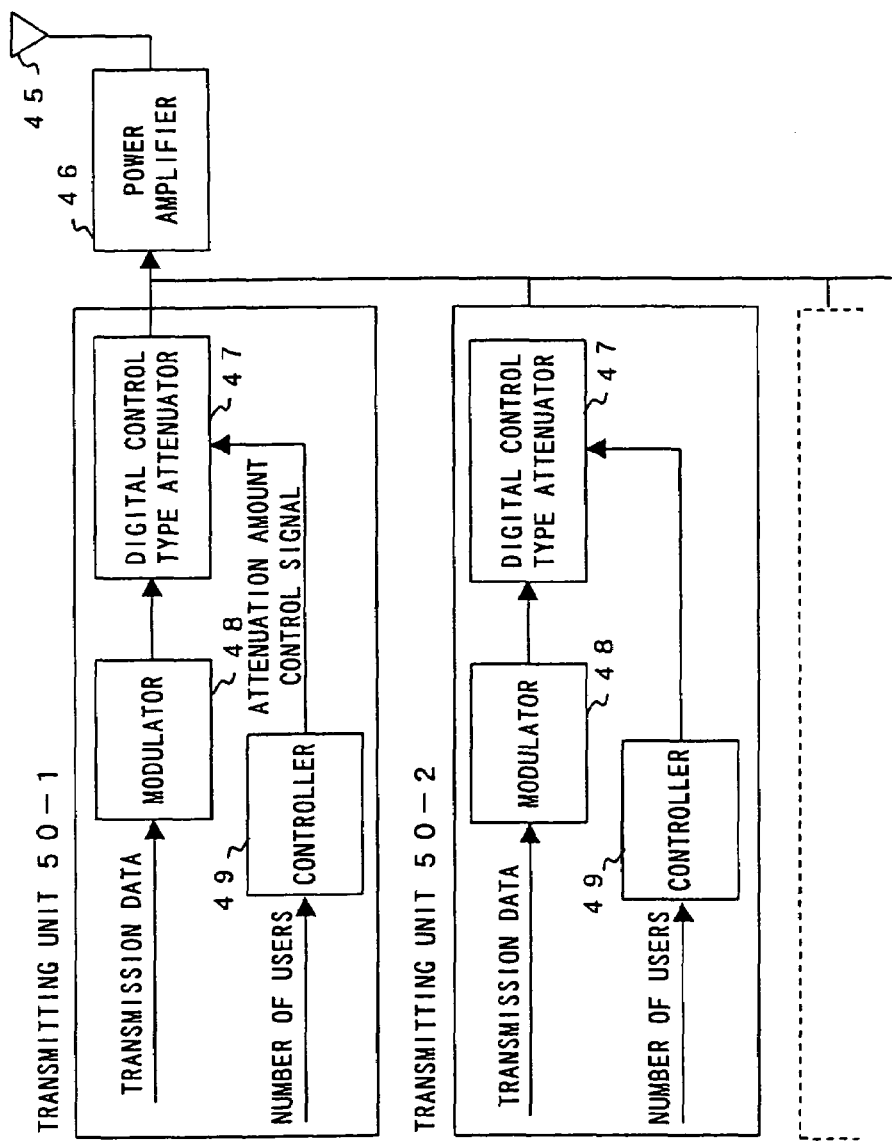
FIG. 15 shows a base station according to a first preferred embodiment of the present invention.

FIG. 15 is a block diagram showing the configuration of a base station according to a first preferred embodiment of the present invention.

This figures shows the configuration of a transmitting station. As shown in this figure, transmitting units 50-1, 50-2, . . . , which respectively generate a signal at a different frequency, are arranged in parallel. Signals output from the transmitting units 50-1, 50-2, . . . are coupled prior to a power amplifier 46, and the coupled signal is amplified by the power amplifier 46. The amplified signal is then transmitted from an antenna 45.

Because all of the fundamental configurations of the transmitting units 50-1, 50-2, . . . are identical except for a difference in the frequencies of output signals, only the internal configuration of the transmitting unit 50-1 is shown. Each of the transmitting units 50-1, 50-2, . . . obtains the number of users accommodated in its frequency from a managing device in a CDMA cellular system, which is not shown, and inputs the obtained number to a controller 49. Additionally, also the data to be transmitted from a base station is input to each of the transmitting units 50-1, 50-2, . . . , and is modulated by a modulator 48. The modulated data is input to a digital control type attenuator 47 (not limited to a digital control type). The attenuation amount of the digital control type attenuator 47 is controlled by an attenuation amount control signal that the controller 49 generates based on the number of users in a corresponding frequency. By increasing the attenuation amount of the frequency in which many users are accommodated and decreasing the attenuation amount of the frequency in which few users are accommodated within the transmitting units 50-1, 50-2, . . . , the signal having the frequency in which few users are accommodated is transmitted with great strength. In this way, when a mobile station comprising a receiving device according to any of the first through the eighth preferred embodiments is used, many new users are accommodated in a frequency where few users are accommodated when using a mobile station comprising a receiving device according to any of the first through the eighth preferred embodiments. Assume that the transmission power of a perch channel at a frequency whose traffic is heavy is "P1", and the transmission power of the perch channel at the frequency whose traffic is light is "Pg". If P1>Pg is satisfied at this time, the probability that most new users within a service area subscribe to the frequency whose traffic is light becomes high. If "P1" is set to be sufficiently large for "Pg", it becomes possible to accommodate most of the new users in a cell whose traffic is light.

This implementation is for the case where the transmission power of a perch channel at a single carrier frequency is controlled. A modulation operation such as spreading, etc. is performed for the data transmitted on the perch channel, and its transmission power is adjusted by the controller 49 with the attenuator 47 which can control the attenuation amount. Then, the data signal is amplified by the power amplifier 46 and is transmitted. The number of transmission users within the cell is input to the controller 49 as data, and the attenuation amount of the attenuator 47 is determined with this data.

Additionally, if the level of a common short code in a perch channel signal in a certain carrier frequency cell is sufficiently lowered and if the remaining portion of the perch channel signal except for the common short code portion is transmitted and left unchanged, no more users can newly subscribe to the cell. If the base station sets the power of the common code spread signal in a perch channel signal of a different carrier frequency for the cell to a power higher than the power of the certain carrier frequency spread signal at this time, most new users subscribe to the cell having the carrier frequency at which the transmission power of the common short code is higher. Considering noise, interference, etc., 100 percent new users do not always subscribe to the cell having the carrier frequency at which the transmission power of the common short code spread signal is higher. However, this tendency grows as the difference between the transmission powers increases. If a mobile station requires a common short code spread signal at the time of handover to a certain cell, it becomes possible to disable the handover to the cell. It doesn't matter if a user currently existing in the cell requires the broadcast information (spread by a signal other than the common short code) about a perch channel signal during a call in this case, because this information is continuously broadcast.

Furthermore, the above described implementations are available also to a base station which physically separates and accommodates cells having different carrier frequencies. For example, many mobile stations temporarily concentrate in a particular area in some cases when an event such as a festival is held. In such a case, problems such as a difficulty in making a telephone call, a degradation in a speech quality, etc. can possibly occur because the accommodation capacity of an existing base station is exceeded. When the number of users reaches a predetermined number at an existing base station in this case, the power of the common short code spread signal is minimized (reduced to "0" if possible) and the power of the short code spread signal at a base station arranged on demand is transmitted at a normal level, thereafter, most users come to subscribe to the cell at the base station arranged on demand. As a result, the problems such as a difficulty in making a telephone call and a degradation in a speech quality can be prevented from occurring. There is an advantage to a mobile station that the initial cell search time does not increase. Additionally, this method is available for the system where a perch channel exists in a single frequency although the system itself uses a plurality of carrier frequencies. In this case, a mobile station makes an initial cell search for the single frequency.

Figure 16:
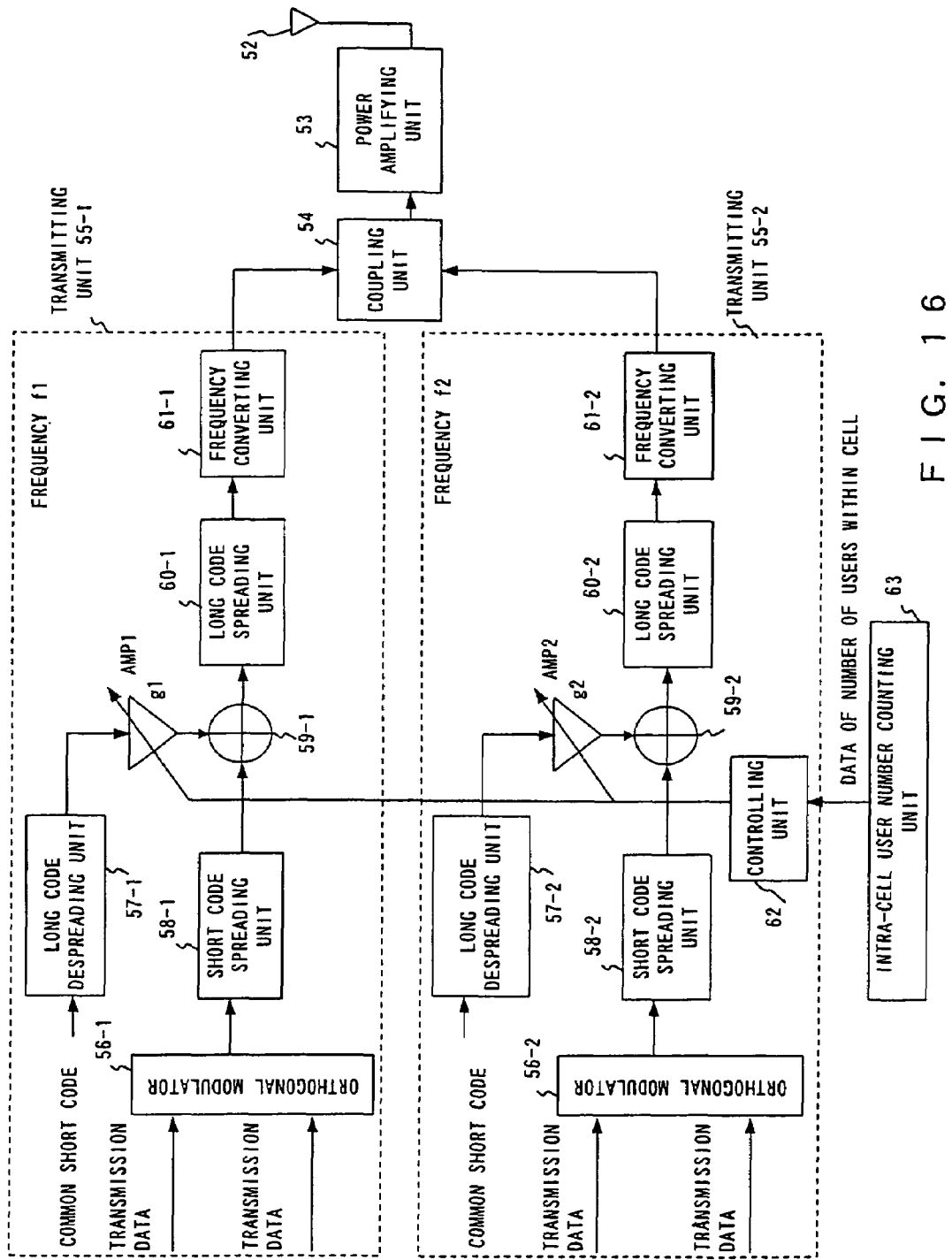
FIG. 16 shows a base station according to a second preferred embodiment of the present invention.

FIG. 16 is a block diagram showing the configuration of a base station according to a second preferred embodiment.

This figure assumes only "f1" and "f2" to be the frequencies used by the base station. However, the number of frequencies used by the base station is not always limited to two.

This preferred embodiment is intended to independently control only the transmission power of a common short code spread signal on a perch channel. Remaining data except for the long code-masked portion on the perch channel is orthogonally multiplexed by orthogonal modulators 56-1 and 56-2, and the multiplexed data is spread with a common short code by short code spreading units 58-1 and 58-2. The common short code is spread (despread) with a long code by long code despreading units 57-1 and 57-2, weighted (amplified with gains "g1" and "g2") by amplifiers AMP1 and AMP2, and time-multiplexed with the data output from the short code spreading units 58-1 and 58-2. Here, adders 59-1 and 59-2 perform an exclusive-OR operation. The time-multiplexed signal is spread with the long code by long code spreading units 60-1 and 60-2. A transmitting unit 55-1 frequency-converts the signal spread with the long code into a signal having a frequency "f1", and outputs the signal. In the meantime, a transmitting unit 55-2 frequency-converts the signal spread with the long code into a signal having a frequency "f2", and outputs the signal. The signals having the frequencies "f1" and "f2" are coupled by a coupling unit 54, and power-amplified by a power amplifier 53. Then, the amplified signal is transmitted from an antenna 52.

The reason that the common short code is spread with the long code by the long code spreading units 60-1 and 60-2 after being despread with the long code by the long code despreading units 57-1 and 57-2 is to prevent the long code-masked portion from being spread with the long code. Namely, the common short code is spread with the long code after being despread with the same long code, so that the long code is cancelled and the common short code itself is output.

The gains "g1" and "g2" of the weighting of the amplifiers AMP1 and AMP2 are determined according to the number of users within a cell in the controlling unit 62. The number of users within a cell is obtained from the notification from an intra-cell user number counting unit 63 arranged as a user monitoring capability of a CDMA cellular system. That is, the gains "g1" and "g2" of the amplifiers AMP1 and AMP2 within the transmitting units 55-1 and 55-2 having a frequency in which a large number of users within a cell is accommodated are decreased, while the gains "g1" and "g2" of the amplifiers AMP1 and AMP2 within the transmitting units 55-1 and 55-2 having a frequency in which a small number of users within a cell is accommodated are increased. If orthogonal modulation is not performed, the orthogonal modulators 56-1 and 56-2 shown in FIG. 15 are unnecessary. Additionally, if a perch channel is arranged in a single carrier wave frequency depending on a system, only one transmitting unit is sufficient to implement this preferred embodiment.

Or, not the number of users, but a signal-to-interference power ratio, a signal-to-(interference+noise power) ratio, an interference power, or an interference+noise power can be used. These items of information can be measured with a known technique. These information are input to the controlling unit 62 instead of the number of users in such a case. That is, the number of users that can be accommodated within a cell depends on the level of an interference power or a noise power. Therefore, the gains "g1" and "g2" can be adjusted to allow the maximum number of users to be accommodated in a cell without exceeding the number of users that can be accommodated within the cell.

A transmission-to-interference power ratio base station side measuring unit or an interference power measuring unit, which is intended for controlling a transmission power of a CDMA cellular system, is made common to that used in this preferred embodiment, thereby reducing hardware amount, an operation amount, and a consumption power.

Figure 17:
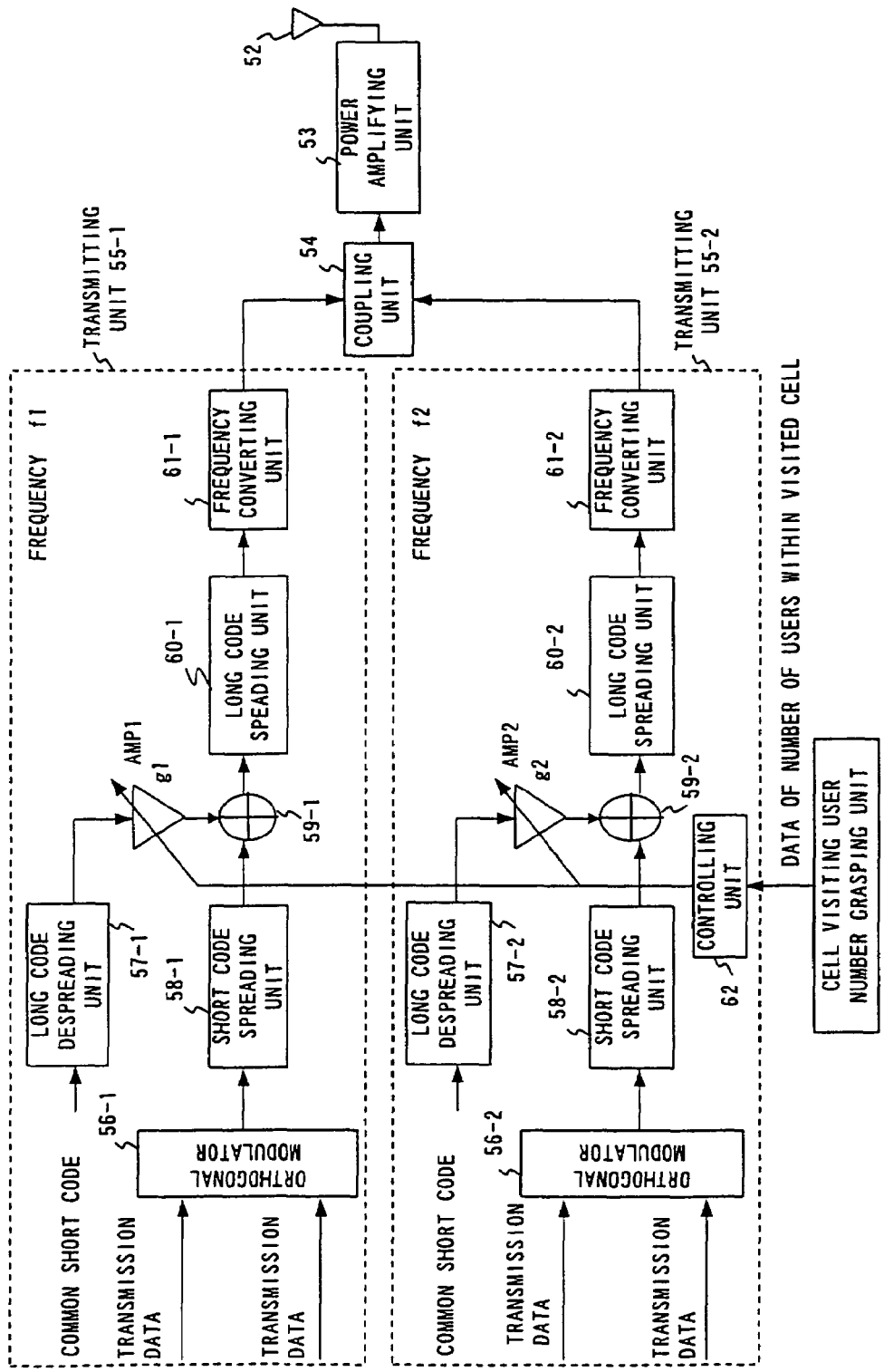
FIG. 17 shows a base station according to a third preferred embodiment of the present invention.

FIG. 17 is a block diagram showing the configuration of a base station according to a third preferred embodiment of the present invention.

In this figure, the same constituent elements as those shown in FIG. 16 are denoted by the same reference numerals.

This preferred embodiment is intended to control the transmission power of a perch channel signal in each carrier frequency at a base station according to the number of users within a visited cell, or to control the base station transmission power of the signal spread with the common short code within a perch channel signal in each carrier frequency. In this case, the above described transmission power is controlled according to an average traffic volume including potential traffic. Namely, the base station according to the second preferred embodiment determines the gains "g1" and "g2" of the amplifiers AMP1 and AMP2 based on the number of users that actually access the base station. However, according to the third preferred embodiment, a base station determines the gains "g1" and "g2" of amplifiers AMP1 and AMP2 based on the number of users existing within a cell that the base station itself covers. For example, a controlling unit 62 can learn the number of users to be accommodated by the local base station from the number of users within a visited cell. Therefore, the gains "g1" and "g2" of the amplifiers AMP1 and AMP2 are controlled to allocate the frequency channels possessed by the local base station to the users as efficiently as possible. For example, if the users are evenly accommodated in all of the frequencies possessed by the local base station, the amplifiers AMP1 and AMP2 are switched to increase the gains at predetermined time intervals. As a result, the channels used by the visiting users can be allocated almost evenly.

With the configuration according to this preferred embodiment, after the number of users within a visited cell is obtained, it is compared with the number of users within a visited cell of a different station. If many mobile stations exist in a cell of a next base station and if few mobile stations exist in a cell of a local base station, the gains "g1" and "g2" of the amplifiers AMP1 and AMP2 are increased to accommodate the mobile stations existing in the cell of the next base station in the local base station. In this way, the situation where many mobile stations access a particular base station, which cannot accommodate all of the mobile stations, can be prevented.

Since the number of users within a visited cell is normally stored in a CDMA cellular system visit location register outside a base station, the number is read from this register. Unlike a normal visit location register, the visit location register according to this preferred embodiment also grasps in which base station area each mobile station stays.

The transmission data in the portions except for the long code-masked portions are orthogonally modulated by orthogonal modulators 56-1 and 56-2, and spread with a common short code by short code spreading units 58-1 and 58-2. Then, these portions are spread by long code spreading units 60-1 and 60-2, and frequency-converted into signals having respective frequencies. The frequency-converted signals are coupled by a coupling unit 54, and the coupled signal is transmitted from an antenna 52 via a power amplifier 53. After the portions of the common short code in the long code-masked portions are despread with a long code by long code despreading units 57-1 and 57-2, they are amplified with the gains "g1" and "g2" by the amplifiers AMP1 and AMP2. The amplified signals are time-multiplexed with the data from the short code spreading units 58-1 and 58-2 by adders 59-1 and 59-2, and are spread by the long code spreading units 60-1 and 60-2. After the spread signals are frequency-converted into signals having respective frequencies, they are coupled by the coupling unit 54, and the coupled signal is transmitted from the antenna via the power amplifier 53.

Figure 18:
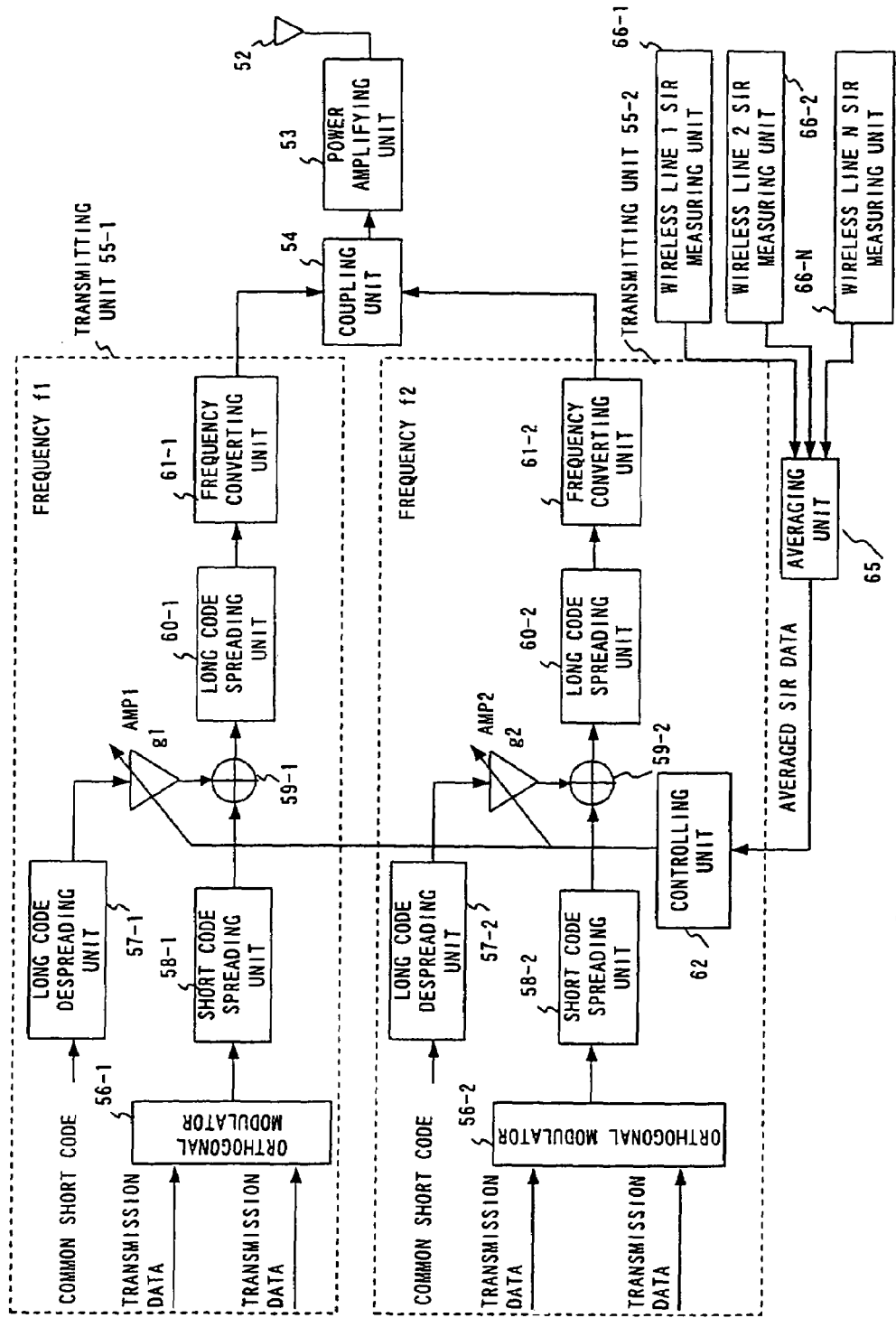
FIG. 18 shows a base station according to a fourth preferred embodiment of the present invention.

FIG. 18 is a block diagram showing the configuration of a base station according to a fourth preferred embodiment of the present invention.

In this figure, the same constituent elements as those shown in FIG. 17 are denoted by the same reference numerals.

According to this preferred embodiment, the measurement result of an upward signal-to-interference power ratio, a signal-to-(interference power+noise) ratio, an interference power, or an interference+noise power at a base station is averaged, and the averaged value is used to control the transmission power of a transmitting unit having each frequency in a CDMA cellular system.

Especially, in the configuration shown in FIG. 18, the weight of a common short code is determined by a controlling unit 62 based on the average of the measurement value of a wireless line signal-to-interference power ratio at each frequency at a base station. This wireless line signal-to-interference power ratio is also used to control the upward transmission power of each wireless line. An SIR measurement method is already known. Also the configuration for measuring Eb/IO can be implemented instead of the SIR.

Namely, the signal-to-interference power ratios (SIRs) measured by a wireless line 1 SIR measuring unit 66-1 through a wireless line N SIR measuring unit 66-N are averaged by an averaging unit 65 for each frequency, and the obtained data is provided to a controlling unit 62. The controlling unit 62 performs control so as to decrease the amplification gain of the amplifier for a transmitting unit 55 having the frequency whose SIR value is large, and to increase the amplification gain of the frequency whose SIR value is small based on the averaged SIR data for each frequency input from the averaging unit 65. As a result, the frequency whose SIR value is large, that is, the frequency of a low communication quality accommodates only a few users, while the frequency whose SIR value is small can accommodate many users. As a result, a service of a high communication quality can be provided as a whole.

Since other configurations and operations according to this preferred embodiment are similar to those of the above described base stations according to the second and the third preferred embodiments, their explanations are omitted here.

Additionally, the above described mobile station and base stations according to the preferred embodiments of the present invention can also be applied to a system having a single carrier frequency. A mobile station is assumed to select the cell whose common short code reception level is the highest as a visited cell as referred to in the conventional technique. If the transmission power of the common short code spread signal on the perch channel at a certain base station is set to a level lower than that of a peripheral base station at a single carrier frequency, the mobile station subscribes to the cell of the base station whose transmission power of the common short code is higher. As a result, a subscription to a particular base station can be restricted. On the other hand, if the transmission power of the common short code spread signal on the perch channel at a certain station is set to a value higher than that of a peripheral base station, a subscription to the perch channel can be promoted. In this case, some users peripheral to the base station whose transmission power is lowered subscribe to the cell of a base station peripheral to that base station. Because the respective preferred embodiments according to the present invention are applied to a system having a single carrier frequency by using only a single carrier frequency in the configurations of the respective preferred embodiments, their detailed explanations are omitted here. In such a system, a mobile station may make a cell search at a single frequency as indicated by the conventional technique.

The above explanation is simplified and provided in such a way that only a common short code is the code input to the long code despreading units 57-1 and 57-2 in the base stations according to the second to the fourth preferred embodiments of the present invention. Actually, however, a common short code and a group short code are combined and input.

According to the present invention, a mobile station can access the most suitable channel of a base station, and at the same time, the base station can control the channel that the mobile station accesses according to the allocation status of mobile stations in a spread communication system, whereby an efficient communication service can be provided while maintaining a communication quality.

What is claimed is:

1. A mobile station for use in a spread communication system having a particular channel for establishing synchronization, the particular channel for establishing synchronization existing on a plurality of carrier frequencies, comprising:
   a receiving unit receiving the plurality of carrier frequencies;
   a measuring unit measuring a strength or a correlation value of a spread signal on the particular channel for each of the plurality of carrier frequencies;
   a storing unit storing information about the particular channel having a signal strength or correlation value for each of the plurality of carrier frequencies; and
   a synchronization establishing unit establishing synchronization on one of the carrier frequencies of the plurality of carrier frequencies based on the information stored in said storing unit, wherein said synchronization establishing unit selects for establishing synchronization a carrier frequency based on the information stored in said storing unit.

2. The mobile station according to claim 1, further comprising
   a comparing unit comparing the signal strength or correlation value, which is measured by said measuring unit, with a predetermined threshold value, and
   wherein said storing unit stores information about the particular channel having the signal strength or correlation value which is larger than the predetermined threshold value.

3. The mobile station according to claim 1, further comprising:
   a comparing unit comparing the signal strength or correlation value, which is measured by said measuring unit, with a predetermined threshold value, and
   wherein said synchronization establishing unit attempts to establish synchronization based the comparison of said comparing unit.

4. The mobile station according to claim 1, wherein said synchronization establishing unit selects for establishing synchronization a carrier frequency having the spread signal whose signal strength measured by said measuring unit is the strongest.

5. The mobile station according to claim 1, wherein said synchronization establishing unit sequentially attempts to establish synchronization for the spread signal on the particular channel in each carrier frequency in descending order of the signal strength measured by said measuring unit.

6. The mobile station according to claim 1, wherein:
   said receiving unit orthogonally demodulates a reception spread signal over a single carrier frequency among the plurality of carrier frequencies;
   said measuring unit generates timing-correlational square amplitude calculation value data by calculating square amplitude calculation values of correlation values measured for the orthogonally demodulated spread signal; and
   a comparing unit compares the correlational square amplitude calculation value with a predetermined threshold value.

7. The mobile station according to claim 6, wherein said storing unit stores only timing-correlational square amplitude calculation value data exceeding the threshold value based on a result of a comparison made by said comparing unit.

8. The mobile station according to claim 6, further comprising
   a selecting unit for selecting timing-correlational square amplitude calculation data having a maximum correlational square amplitude calculation value from among timing-correlational square amplitude calculation value data for each carrier frequency.

9. The mobile station according to claim 6, further comprising
   a sorting unit for rearranging timing-correlation square amplitude calculation value data of all of carrier frequencies, which are generated by said measuring unit, in descending order of correlational square amplitude calculation values.

10. The mobile station according to claim 6, further comprising:
    a classifying unit for performing classification for a plurality of pieces of timing-correlational square amplitude calculation value data by recognizing the data to be transmitted from a same base station, if the plurality of timing-correlational square amplitude calculation value data indicating identical timing exist for each carrier frequency; and
    a selecting unit for selecting only data having a largest square amplitude calculation value from among timing and square amplitude calculation value data corresponding to spread signals of each base station, which are classified by said classifying unit, wherein said synchronization establishing unit uses only data selected by said selecting unit so as to establish synchronization.

11. The mobile station according to claim 10, further comprising
    a sorting unit for rearranging timing-correlational square amplitude calculation value data of all of carrier frequencies, which are generated by said measuring unit, in descending order of correlational square amplitude calculation values, wherein said classifying unit performs the classification based on a sorting result of said sorting unit.

12. The mobile station according to claim 10, wherein reception timing of the spread signal on the particular channel, which is transmitted over the plurality of carrier frequencies, is shifted by predetermined timing, the mobile station further comprising:
    a delaying unit for delaying an output from said measuring unit by the predetermined timing for each frequency;
    a controlling unit for controlling said delaying unit, and for making said storing unit store timing-correlational square calculation value data where the reception timing of the spread signal on the particular channel, which is transmitted over the plurality of carrier frequencies, is cancelled; and
    a determining unit for determining that signals are transmitted from a same base station if timing-correlational square calculation value data stored in said storing unit indicate identical timing.

13. A mobile station for use in a spread communication system having a particular channel for establishing synchronization, the particular channel for establishing synchronization existing on a plurality of carrier frequencies, comprising:
    a receiving unit receiving the plurality of carrier frequencies;
    a measuring unit measuring a strength or a correlation value of a spread signal on the particular channel for each of the plurality of carrier frequencies; and a controller selecting a carrier frequency of the plurality of carrier frequencies for performing a cell search based on the measuring from the measuring unit.

14. The mobile station according to claim 13, wherein said controller selects the carrier frequency for establishing synchronization based on a carrier frequency having the spread signal whose signal strength measured by said measuring unit is the strongest.

15. The mobile station according to claim 13, further comprising:
   a storing unit storing information about the spread signal of the particular channel having the signal strength or correlation value which is largest in each carrier frequency of the plurality of carrier frequencies.

16. A mobile station for use in a spread communication system having a particular channel for establishing synchronization, the particular channel for establishing synchronization existing on a plurality of carrier frequencies, comprising:
   a receiving unit receiving the plurality of carrier frequencies;
   a measuring unit measuring a strength or a correlation value of a spread signal on the particular channel for each of the plurality of carrier frequencies; and
   a controller determining the spread signal of the particular channel having the signal strength or correlation value which is largest in each carrier frequency of the plurality of carrier frequencies, and selecting a carrier frequency for performing a cell search.

17. A mobile station for use in a spread communication system having a particular channel for establishing synchronization, the particular channel for establishing synchronization existing on a plurality of carrier frequencies, comprising:
   a receiving unit receiving the plurality of carrier frequencies;
   a measuring unit measuring a strength or a correlation value of a spread signal on the particular channel for each of the plurality of carrier frequencies;
   a selecting unit for selecting timing-correlational square amplitude calculation data having a maximum correlational square amplitude calculation value from among timing-correlational square amplitude calculation value data for each carrier frequency; and
   a controller selecting a carrier frequency of the plurality of carrier frequencies for performing a cell search based on the selecting unit.

18. A method for a spread communication system having a particular channel for establishing synchronization, the particular channel for establishing synchronization existing on a plurality of carrier frequencies, the plurality of carrier frequencies transmitted from one or more base stations, comprising the steps of:
   receiving the plurality of carrier frequencies;
   measuring a strength or a correlation value of a spread signal on the particular channel for each of the plurality of carrier frequencies; and
   selecting a carrier frequency of the plurality of carrier frequencies for performing a cell search based on the measuring step.

19. The method according to claim 18, wherein the selecting step selects the carrier frequency for establishing synchronization based on a carrier frequency having the spread signal whose measured signal strength is the strongest.

20. The method according to claim 18, further comprising the step of:
   storing information about the spread signal of the particular channel having the signal strength or correlation value which is largest in each carrier frequency of the plurality of frequencies.

21. A method for use in a spread communication system having a particular channel for establishing synchronization, the particular channel existing on a plurality of carrier frequencies, the plurality of carrier frequencies transmitted from one or more base stations, comprising the steps of:
   receiving the plurality of carrier frequencies;
   measuring a strength or a correlation value of a spread signal on the particular channel for each of the plurality of carrier frequencies;
   determining the spread signal of the particular channel having the signal strength or correlation value which is largest in each carrier frequency of the plurality of carrier frequencies; and
   selecting a carrier frequency for performing a cell search based on the determining step.

22. A method for use in a spread communication system having a particular channel for establishing synchronization, the particular channel for establishing synchronization existing on a plurality of carrier frequencies, the plurality of carrier frequencies transmitted from one or more base stations, comprising the steps of:
   receiving the plurality of carrier frequencies;
   measuring a strength or a correlation value of a spread signal on the particular channel for each of the plurality of carrier frequencies;
   selecting timing-correlational square amplitude calculation data having a maximum correlational square amplitude calculation value from among timing-correlational square amplitude calculation value data for each carrier frequency; and
   selecting a carrier frequency for performing a cell search based on the selecting timing-correlational square amplitude calculation data step.

23. A spread communication system having a particular channel for establishing synchronization, the particular channel for establishing synchronization existing on a plurality of carrier frequencies, comprising:
   a base station transmitting the particular channel for establishing synchronization on one or more carrier frequencies of the plurality of carrier frequencies;
   a receiving unit receiving the plurality of carrier frequencies;
   a measuring unit measuring a strength or a correlation value of a spread signal on the particular channel for each of the plurality of carrier frequencies; and
   a controller determining the spread signal of the particular channel having the signal strength or correlation value which is largest in each carrier frequency of the plurality of carrier frequencies, and selecting a carrier frequency for performing a cell search.

24. A mobile station for use in a spread communication system having a particular channel for establishing synchronization, the particular channel for establishing synchronization existing on a plurality of carrier frequencies, comprising:
   a receiving unit receiving the plurality of carrier frequencies;
   a measuring unit measuring a strength of a spread signal on the particular channel for each of the plurality of carrier frequencies; and
   a controller selecting a carrier frequency of the plurality of carrier frequencies for performing a cell search based on the measuring from the measuring unit.

25. A method for a spread communication system having a particular channel for establishing synchronization, the particular channel for establishing synchronization existing on a plurality of carrier frequencies, the plurality of carrier frequencies transmitted from one or more base stations, comprising the steps of:

receiving the plurality of carrier frequencies;

measuring a strength of a spread signal on the particular channel for each of the plurality of carrier frequencies; and selecting a carrier frequency of the plurality of carrier frequencies for performing a cell search based on the measuring step.

26. A cell search method in a spread communication system having a particular channel for establishing synchronization existing on a plurality of carrier frequencies, the plurality of carrier frequencies transmitted from one or more base stations, comprising:

receiving the plurality of carrier frequencies;

measuring a strength or a correlation value of a spread signal on the particular channel for each of the plurality of carrier frequencies;

determining the spread signal of the particular channel having the signal strength or correlation value which is largest in each carrier frequency of the plurality of carrier frequencies; and performing a cell search in each carrier frequency until a cell having the signal strength or correlation value meeting a predetermined criteria is obtained.

27. A cell search method for use in a spread communication system having a particular channel for establishing synchronization, the particular channel for establishing synchronization existing on a plurality of carrier frequencies, a carrier frequency including multiple channels which are spread modulated with a spread code which differs depending on each channel accommodated by a base station, comprising the steps of:

receiving the plurality of carrier frequencies;

measuring a strength or a correlation value of a spread signal on the particular channel for each of the plurality of carrier frequencies;

determining the spread signal of the particular channel having the signal strength or correlation value which is largest in each carrier frequency of the plurality of carrier frequencies; and performing a cell search in each carrier frequency until a cell having the signal strength or correlation value meeting a predetermined criteria is obtained.

28. A mobile station for use in a spread communication system having a base station transmitting a particular channel for establishing synchronization on one or more carrier frequencies, a carrier frequency including multiple channels which are spread modulated with a spread code which differs depending on each channel accommodated by the base station, comprising:

a receiving unit receiving the plurality of carrier frequencies;

a measuring unit measuring a strength or a correlation value of a spread signal on the particular channel for each of the plurality of carrier frequencies; and a controller determining the spread signal of the particular channel having the signal strength or correlation value which is largest in each carrier frequency of the plurality of carrier frequencies, and performing a cell search in each carrier frequency until a cell having the signal strength or correlation value meeting a predetermined criteria is obtained.

29. A cell search method for a mobile station in a spread communication system having a base station transmitting a particular channel for establishing synchronization on one or more carrier frequencies, a carrier frequency including multiple channels which are spread modulated with a spread code which differs depending on each channel accommodated by the base station, comprising:

measuring a strength or a correlation value of a spread signal on the particular channel for each received carrier frequency of the plurality of carrier frequencies; and determining the spread signal of the particular channel having the signal strength or correlation value which is largest in each carrier frequency of the plurality of carrier frequencies; and performing a cell search for establishing synchronization in each carrier frequency until a cell having the signal strength or correlation value meeting a predetermined criteria is obtained.

* * * * *